(12) United States Patent
Nakano et al.

(10) Patent No.: US 9,621,743 B2
(45) Date of Patent: Apr. 11, 2017

(54) TERMINAL DEVICE WHICH PERFORMS COMMUNICATION WITH AN IMAGE PROCESSING DEVICE AFTER SWITCHING A WORKING APPLICATION IN THE TERMINAL DEVICE

(71) Applicant: KONICA MINOLTA, INC., Chiyoda-ku, Tokyo (JP)

(72) Inventors: Daisuke Nakano, Kobe (JP); Junichi Hase, Osaka (JP); Hirokazu Kubota, Otsu (JP); Nobuhiro Mishima, Osaka (JP); Hidetaka Iwai, Itami (JP); Yuji Okamoto, Nishinomiya (JP); Hideaki Soejima, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/793,293

(22) Filed: Jul. 7, 2015

(65) Prior Publication Data
US 2016/0014283 A1 Jan. 14, 2016

(30) Foreign Application Priority Data
Jul. 8, 2014 (JP) .................................. 2014-140358

(51) Int. Cl.
*G06F 3/12* (2006.01)
*H04N 1/00* (2006.01)

(52) U.S. Cl.
CPC ..... *H04N 1/00214* (2013.01); *H04N 1/00212* (2013.01); *H04N 1/00244* (2013.01); *H04N 2201/0094* (2013.01)

(58) Field of Classification Search
CPC .............. G06F 3/1292; H04N 1/00214; H04N 1/00244; H04N 1/00212; H04N 1/00941
USPC ......................................................... 358/1.15
See application file for complete search history.

(56) References Cited

U.S. PATENT DOCUMENTS

| | | | | |
|---|---|---|---|---|
| 5,706,411 A | * | 1/1998 | McCormick | G06K 15/00 358/1.14 |
| 2014/0040950 A1 | * | 2/2014 | Clemente | H04N 1/00204 725/37 |

FOREIGN PATENT DOCUMENTS

JP 2013-219437 A 10/2013

\* cited by examiner

*Primary Examiner* — Eric A Rust
(74) *Attorney, Agent, or Firm* — Buchanan Ingersoll & Rooney

(57) ABSTRACT

A terminal device performs communication with a MFP (Multifunction Peripheral), and each of cloud servers. Terminal device executes transmitting and receiving process for image data with the MFP and the cloud servers via a cooperation application program. The terminal device switches a working application in the terminal device to another application, during the transmitting and receiving process via the cooperation application program. In this instance, the terminal device suspends the transmitting and receiving process. The terminal device executes transmitting and receiving process via the another application for a part of the image data for which the transmitting and receiving process is not executed.

25 Claims, 22 Drawing Sheets

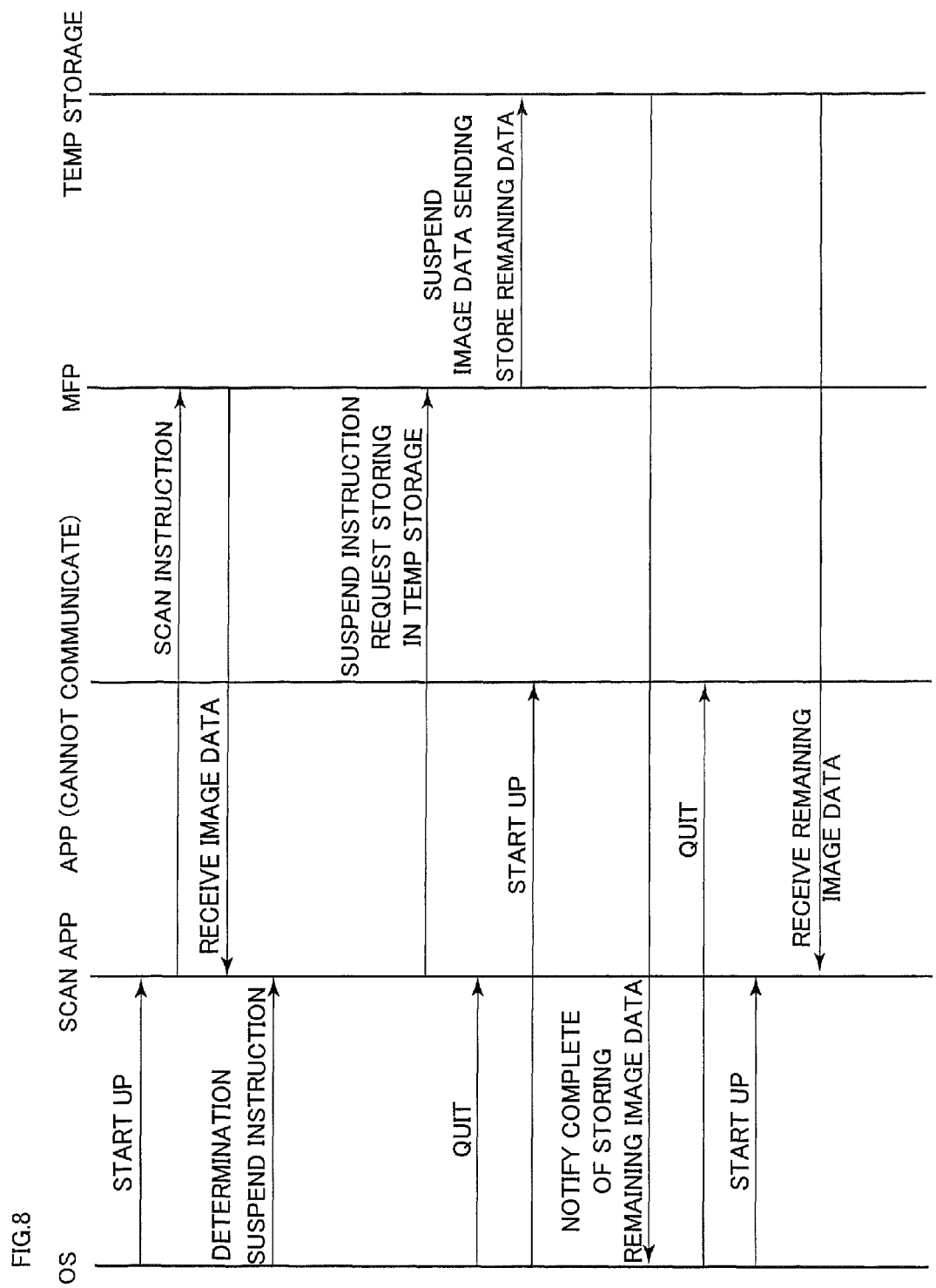

TERMINAL DEVICE WHICH PERFORMS COMMUNICATION WITH AN IMAGE PROCESSING DEVICE AFTER SWITCHING A WORKING APPLICATION IN THE TERMINAL DEVICE

This application is based on Japanese Patent Application No. 2014-140358 filed with the Japan Patent Office on Jul. 8, 2014, the entire content of which is hereby incorporated by reference.

BACKGROUND OF THE INVENTION

Field of the Invention

This invention relates to a terminal device, a control method of a terminal device, and a control program of a terminal device. More specifically, this invention relates to a terminal device, a control method of a terminal device, and a control program of a terminal device which performs communication with an image processing device.

Description of the Related Art

Recently, portable terminal devices such as tablets, smart phones, or the like become sophisticated. They play a role as same as PCs (Personal Computers). Such the portable terminal devices are used in various situations of business and life. For example, a portable terminal device may give an execution instruction of printing to an image forming apparatus. A portable terminal device may give an execution instruction of scanning to an image forming apparatus.

Recently, cloud services (cloud computings) which are provided via a network such as an Internet are in widespread use. Users use computer resources of the provider of cloud services via the network. Then, the users can enjoy the services by their own portable terminal devices, although the users do not possess the computer resources.

After portable terminal devices became sophisticated, cooperation among a portable terminal device, an MFP (Multifunction Peripheral), and a cloud server used for the cloud service is needed. There is an application software program named "Page Scope mobile" (a registered trademark, a product of KONICA MINOLTA, INC.) for portable information terminal devices, which achieves the cooperation. By using the application program, a portable terminal device can instruct MFPs to execute printing or scanning. The portable terminal device can store the scan data acquired by scanning of the MFP in a cloud server, or acquire data to be printed from the cloud server, through the application program.

An application program for a terminal device to achieve cooperation among the terminal device, an image forming apparatus, and a server may be referred as a "cooperation application program".

Document 1 below discloses techniques for cooperation between a portable terminal device and an image forming apparatus. Document 1 below discloses an image processing system having a portable equipment and an image forming apparatus. The portable equipment is equipped with a photographing means, a means to connect with the image forming apparatus, and an image processing means to execute image processing for taken image data and image data transmitted from the image forming apparatus, in a taken image input mode. The image forming apparatus is equipped with a document reading means, a means to connect with the portable equipment, a means for determining whether the portable equipment is connected or not, a means for determining whether the image processing means of the portable equipment started up and the image forming apparatus is in the taken image input mode or not when the portable equipment is connected, and a control means to transmit image data of read documents to the portable equipment when the image processing means started up and the image forming apparatus is in the taken image input mode.

[Document 1] Japan Patent Publication No. 2013-219437

An OS such as iOS (a registered trademark) on which a plurality of application programs can not be executed simultaneously is installed in some conventional terminal devices including portable terminal devices. During such the terminal device performs communication for a desired job such as a scan job, a print job, or the like with an MFP or a cloud server via a cooperation application program, another application program which is different from the cooperation application program may be started up (the application program being executed may be switched) by the user. In this instance, the desired job is not completed, since the cooperation application program stops and the communication with the MFP or the cloud server stops. In consequence, the user needs to re-execute operations for the desired job, and feels inconvenience.

For example, it is assumed that an application program is started up by a user during the terminal device is executing a scan job to import image data acquired by scanning of the MFP to the terminal device. In this case, the scan job will be cancelled. The user should start up the cooperation application program again, and perform the operations for the scan job again.

For example, it is assumed that an application program is started up by a user during the terminal device is executing a scan job to upload image data acquired by scanning of the MFP from the terminal device to a cloud server, after the terminal device imported the image data. In this case, the image data remains in the terminal device. The image data is not stored in the cloud server. Hence, the user should start up the cooperation application program again, and perform the operations to upload the image data to the cloud server again.

For example, it is assumed that an application program is started up by a user during the terminal device is downloading image data stored in a cloud server, as a print job for printing out the image data stored in the cloud server by a MFP. In this case, the print job is cancelled. The user should start up the cooperation application program again, and perform the operations for the print job again.

Further, for example, it is assumed that an application program is started up by a user during the terminal device is transmitting downloaded image data to a MFP, as a print job for printing out the image data stored in the cloud server by the MFP. In this case, the print job is cancelled. The user should start up the cooperation application program again, and perform the operations for the print job again.

SUMMARY OF THE INVENTION

This invention is to solve the above problems. The object is to provide a terminal device, a control method of a terminal device, and a control program of a terminal device that can improve convenience.

According to one aspect of the invention, a terminal device comprising a processor which performs communication with an image processing device, the processor is configured to: execute a first transmitting and receiving process for image data with the image processing device via a first application; switch a working application in the terminal device to a second application which is different from the first application, during the first transmitting and receiving process; suspend the first transmitting and receiving process when the working application in the terminal device is switched; and execute a second transmitting and receiving process for a part of the image data for which the first transmitting and receiving process is not performed, via the second application, when the first transmitting and receiving process was suspended.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows a sequence diagram for explanation pertaining to the behavior of the image processing system in case that the type of the another application after the switching is an application which cannot perform communication, in the first situation.

DESCRIPTION OF THE PREFERRED EMBODIMENTS

The embodiment of this invention will be explained in the followings, based on the figures.

[The Structure of the Image Processing System]

Firstly, the structure of the image processing system in the embodiment will be explained.

Figure 1:
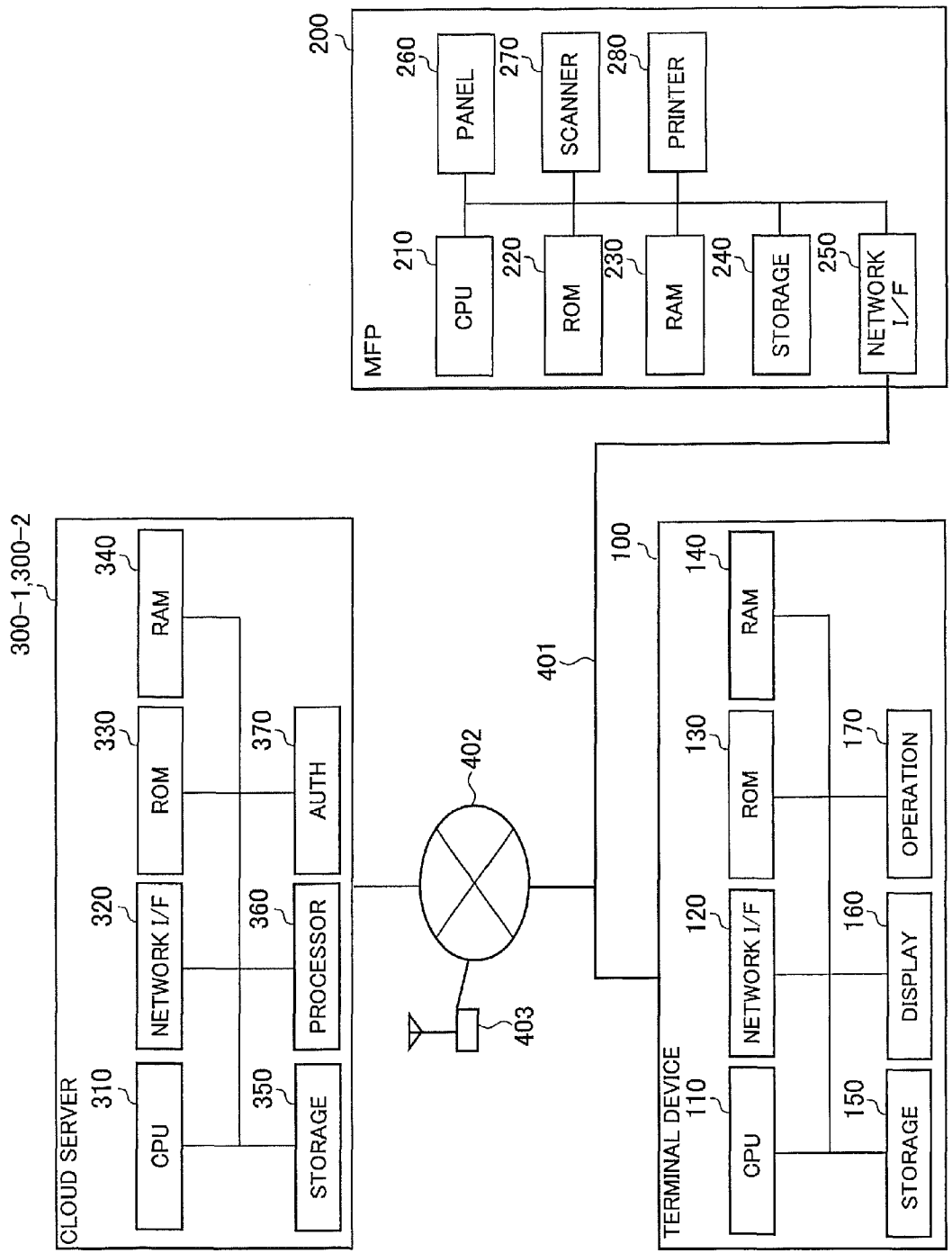
FIG. 1 conceptually shows a structure of an image processing system according to the embodiment of this invention.

FIG. 1 conceptually shows a structure of an image processing system according to the embodiment of this invention.

Referring to FIG. 1, the image processing system of this embodiment has terminal device 100, MFP 200, and cloud servers 300-1 and 300-2. Terminal device 100 and MFP 200 are bilaterally connected with each other via intranet 401 in the office, for example. Intranet 401 is connected with Internet 402. Terminal device 100 and MFP 200 are connected with cloud servers 300-1 and 300-2 via intranet 401 and Internet 402. Terminal device 100 can be wireless connected with Internet 402 via repeater 403, for example when terminal device 100 is taken to the outside of the office by the user.

Intranet 401 uses a private line, for example a wired or wireless LAN. Intranet 401 connects various equipments by using a protocol of TCP/IP (Transmission Control Protocol/Internet Protocol). The equipments connected to intranet 401 can perform communication with each other. The equipments connected to Internet 402 can perform communication with each other. The equipments connected to intranet 401 can perform communication with equipments connected to Internet 402.

Terminal device 100 consists of a portable terminal device, for example a tablet, a wearable display, a note PC (Personal Computer), or a smartphone. Terminal device 100 may consist of a desktop PC or the like which is commonly not a portable equipment. Terminal device 100 includes CPU (Central Processing Unit) 110 for controlling the entirety of terminal device 100, network I/F 120 for performing communication with external devices via intranet 401 or Internet 402 according to instructions from CPU 110, ROM (Read Only Memory) 130 for storing control programs to be executed by CPU 110, RAM (Static Random Access Memory) 140 which is a working memory of CPU 110, storage unit 150 for storing an OS and programs for various applications, etc., display unit 160 for displaying various information, and operation unit 170 for receiving various operations. CPU 110 is bilaterally connected with network I/F 120, ROM 130, RAM 140, storage unit 150, display unit 160, and operation unit 170.

MFP 200 has a scanner function, a facsimile function, a copying function, a function as a printer, a data transmitting function, and a server function. MFP 200 includes CPU 210, ROM 220, RAM 230, storage unit 240, network I/F 250, operation panel 260, scanner 270, and printing unit 280. CPU 210 is bilaterally connected with ROM 220, RAM 230, storage unit 240, network I/F 250, operation panel 260, scanner 270, and printing unit 280.

CPU 210 controls the entirety of MFP 200. ROM 220 stores control programs to be executed by CPU 210. RAM 230 is a working memory for CPU 210. Storage unit 240 stores various information. Network I/F 250 performs communication with external devices. Operation panel 260 includes a display unit, software keys, and hardware keys, etc. Operation panel 260 displays various information and receives various operations.

Scanner 270 reads document images.

Printing unit 280 executes print jobs. Printing unit 280 is roughly configured with a toner image forming unit, a fixing device, and a sheet conveying unit, etc. Printing unit 280 forms (prints) images on papers, using electrophotographic technology, for example. Printing unit 280 can synthesize four color images by a tandem system and form color images on sheets. The toner image forming unit is configured with photo conductors for C (cyan), M (magenta), Y (yellow) and K (black), a secondary transfer belt on which toner images are transferred (the first transfer) from the photo conductors, and a transfer unit for transferring (the second transfer) the images from the secondary transfer belt to sheets, etc. The fixing device has heating rollers and pressure rollers. The fixing device conveys a sheet on which a toner image was formed, pinching the sheet by the heating rollers and the pressure rollers. Then, the sheet is heated and pressured. Herewith, the fixing device melts toner adhered to the sheet and fixes it on the sheet, so that the image is formed on the sheet. The sheet conveying unit is configured with paper feeding rollers, conveying rollers, and motors for driving the rollers, etc. The sheet conveying unit feeds sheets from a paper feeding cartridge, and conveys them in the chassis of MFP 200. The sheet conveying unit discharges sheets on which images were formed, from the chassis of MFP 200 to the copy receiving tray or the like.

The image processing system may have an image forming apparatus of a printer or the like as substitute for the MFP. The image processing system may have a seamier.

Each of cloud servers 300-1 and 300-2 provides services (cloud services) via Internet 402 to users. These services are for providing areas for storing various data. Users of terminal device 100 receive the services provided by each of cloud servers 300-1 and 300-2 via terminal device 100.

For example, each of cloud servers 300-1 and 300-2 is configured with an image processing device as a PC, a MFP, or the like. Each of cloud servers 300-1 and 300-2 includes CPU 310 for controlling the entirety of the cloud server, network I/F 320 for performing communication with external devices via Internet 402 according to instructions from CPU 310, ROM 330 for storing control programs to be executed by CPU 310, RAM 340 which is a working memory of CPU 310, storage unit 350 for storing various information, process executing unit 360 for executing processes related to cloud services, and authentication unit 370 for authenticating users who want to receive services provided by the cloud servers based on received user names and login passwords. CPU 310 is bilaterally connected with network I/F 320, ROM 330, RAM 340, storage unit 350, process executing unit 360, and authentication unit 370. Each of cloud servers 300-1 and 300-2 may have a same structure or a different structure with respect to each other.

In the following first to fifth situations, cloud server 300-1 plays a role of a destination of temporary storing. Cloud server 300-2 plays a role of a final storing destination of image data or a source of image data. Both of terminal device 100 and MFP 200 shall be accessible to cloud server 300-1. Terminal device 100 shall be accessible to cloud server 300-2 by logging in. MFP 200 shall not be accessible to cloud server 300-2.

The image processing system may have terminal devices, MFPs, cloud servers, or the like other than devices shown in FIG. 1.

Figure 2:
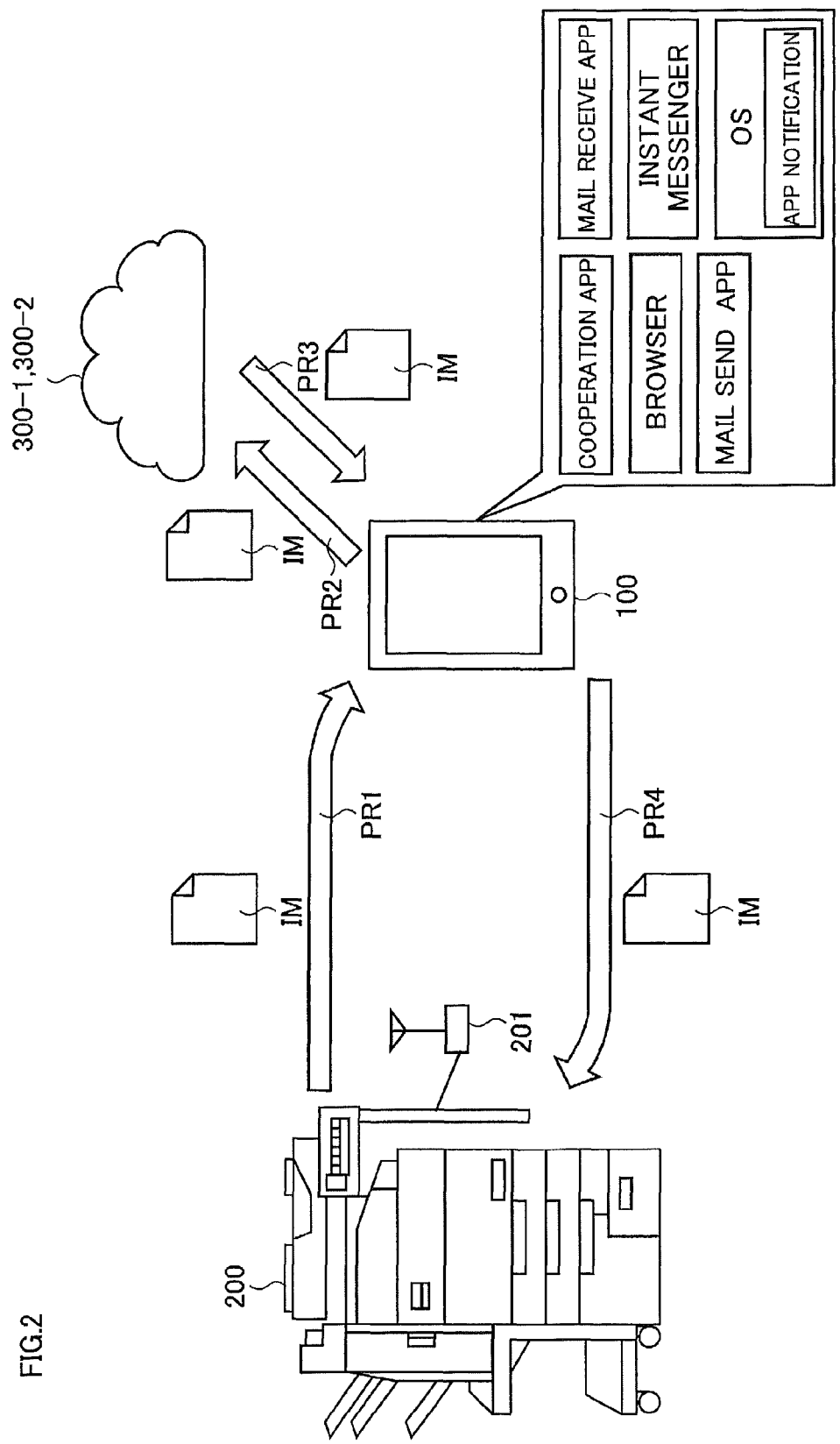
FIG. 2 is for explanation pertaining to applications installed in a terminal device.

FIG. 2 is for explanation pertaining to applications installed in the terminal device.

Referring to FIG. 2, terminal device 100 performs communication with MFP 200 and each of cloud servers 300-1 and 300-2 via access point 201 connected to MFP 200.

An OS is installed in terminal device 100. Terminal device 100 stores the programs of the OS. The cooperation application program (an example of the first application) is installed in terminal device 100. Terminal device 100 stores the programs of the OS and the cooperation application program. The cooperation application program has a scan function (which is referred to as a scan application) and a print function (which is referred to as a print application) in the followings, for example. These functions are realized by means of cooperation among terminal device 100, MFP 200, and cloud servers 300-1 and 300-2.

By the scan function of the cooperation application program, according to operations of the user of terminal device 100, MFP 200 scans documents. The acquired image data IM is stored in terminal device 100 (process PR1), and stored image data IM in terminal device 100 is uploaded in cloud server 300-2 (process PR2).

By the print function of the cooperation application program, according to operations of the user of terminal device 100, image data IM stored in cloud server 300-2 is downloaded to terminal device 100 (process PR3). MFP 200 prints out image data IM which is downloaded in terminal device 100 (process PR4).

Arbitrary applications (which are examples of the second application, and the one may be referred to as "another application" in the followings) other than the cooperation application program are installed in terminal device 100. Terminal device 100 stores programs of the another application.

The another application may be a browser for performing connection with a WWW (World Wide Web), a mail transmitting application (a mailer) for transmitting e-mail, a mail receiving application (a mailer), an instant messenger (for example, LINE (a registered trademark)) for performing communication via Internet among terminals in real time, or the like.

Each of applications installed in terminal device 100 keeps any of an active state, a suspend state and a background state. Active means the state in which the application is working (can perform processes). Suspend means the state in which the application stops the behavior (cannot perform processes). Background means the state in which the application executes processes needed for changing the state from active to suspend.

More than 1 applications cannot simultaneously work (be active) in terminal device 100, due to characteristics of the OS. Hence, when the first application is active and the another application starts up, the first application moves to the background state, performs processes needed, and moves to the suspend state. After that, the another application becomes in the active state.

The OS in terminal device 100 has a notification function for the application. The notification function for the application is a kind of push notification. It is to display the notification for a specific application was received, when the notification was received from MFP 200, cloud server 300-1 or 300-2, or the like.

[The Behavior of the Image Processing System]

Terminal device 100 performs transmitting and receiving processes which transmits or receives image data with the image processing device via the cooperation application program. When terminal device 100 is performing the transmitting and receiving processes, terminal device 100 switches the working application in terminal device 100 to the another application which is different from the cooperation application program. The behavior of the image forming system in this situation will be explained in the followings.

A part of image data which is not transmitted or not received may be referred to as "remaining image data" in the following explanation.

(1) The First Situation

Figure 3:
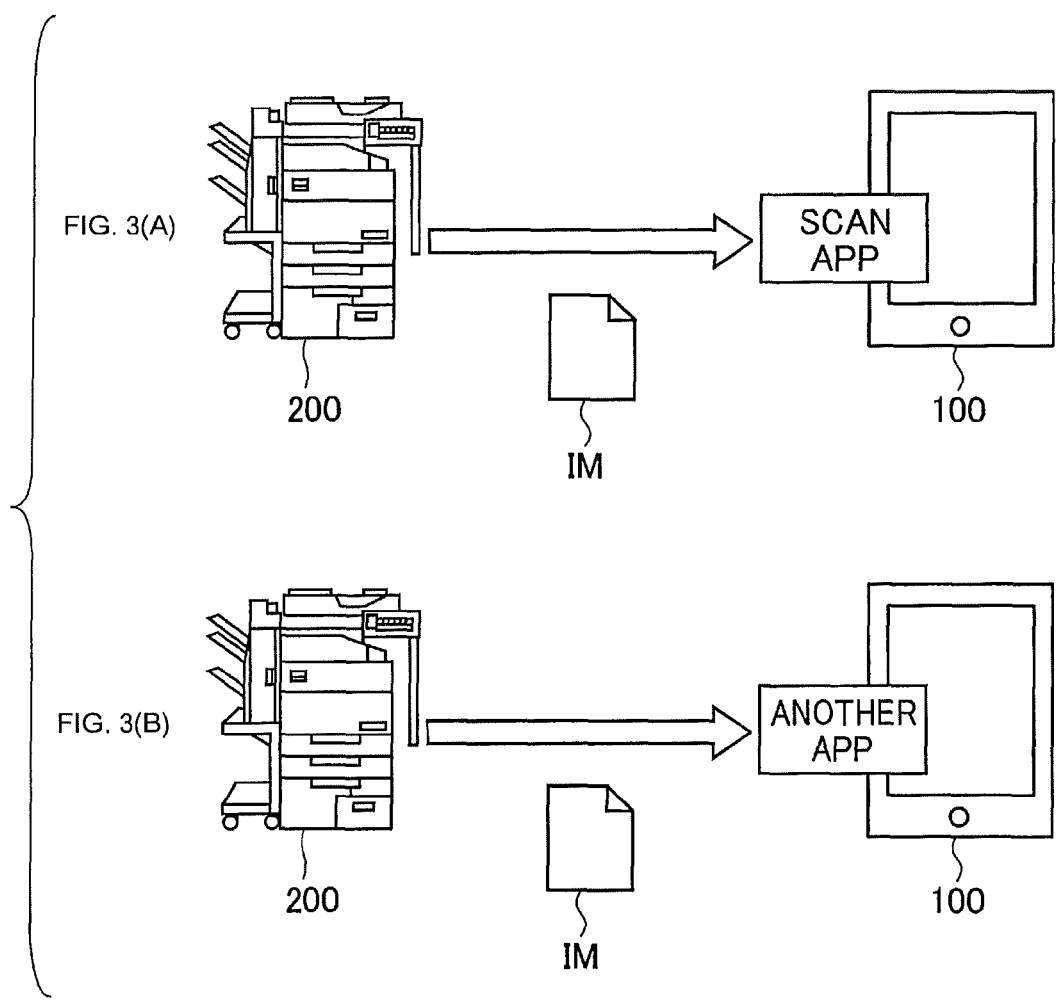
FIGS. 3(A) and 3(B) conceptually show the behavior of the image forming system in case that image data IM can be received via the another application after the switching in the first situation.

FIGS. 3(A) and 3(B) conceptually show the behavior of the image forming system in case that image data IM can be received via the another application after the switching in the first situation.

Referring to FIG. 3(A), the first situation is as the following. Terminal device 100 receives an instruction of performing a scan job from a user of terminal device 100. The scan job is to scan documents by MFP 200 (an example of an image processing device in the first situation), receive the acquired image data of the documents from MFP 200, and store the data in terminal device 100. Terminal device 100 receives an operation from the user for switching the working application in terminal device 100 to the another application, during receiving image data IM of the documents from MFP 200 via the scan application.

In the first situation, terminal device 100 suspends receiving image data IM. Terminal device 100 determines whether image data IM can be received or not via the another application after the switching. For example, terminal device 100 stored tables beforehand which indicate whether each of applications can execute transmitting and receiving processes or not. Terminal device 100 performs the above determination (the determining process) by using the tables.

In case that the type of the another application after the switching is a browser, a mail receiving application, or an instant messenger, image data IM can be received via the another application after the switching. In this instance, terminal device 100 restarts (continues) the communication with MFP 200 via the another application and receives the remaining image data IM, as seen from FIG. 3(B).

Figure 4:
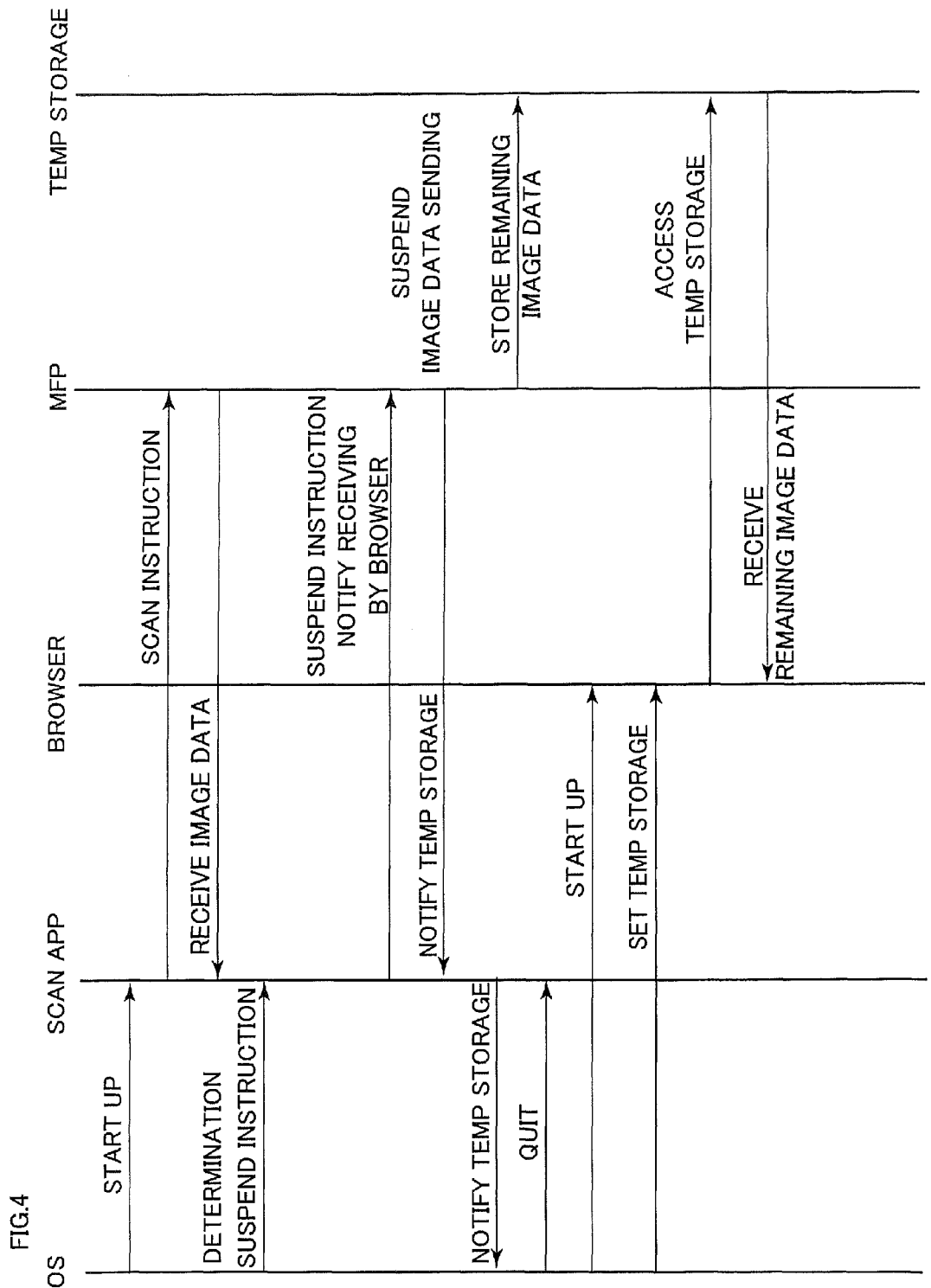
FIG. 4 shows a sequence diagram for explanation pertaining to the behavior of the image processing system, in case that the type of the another application after the switching is a browser, in the first situation.
Figure 5:
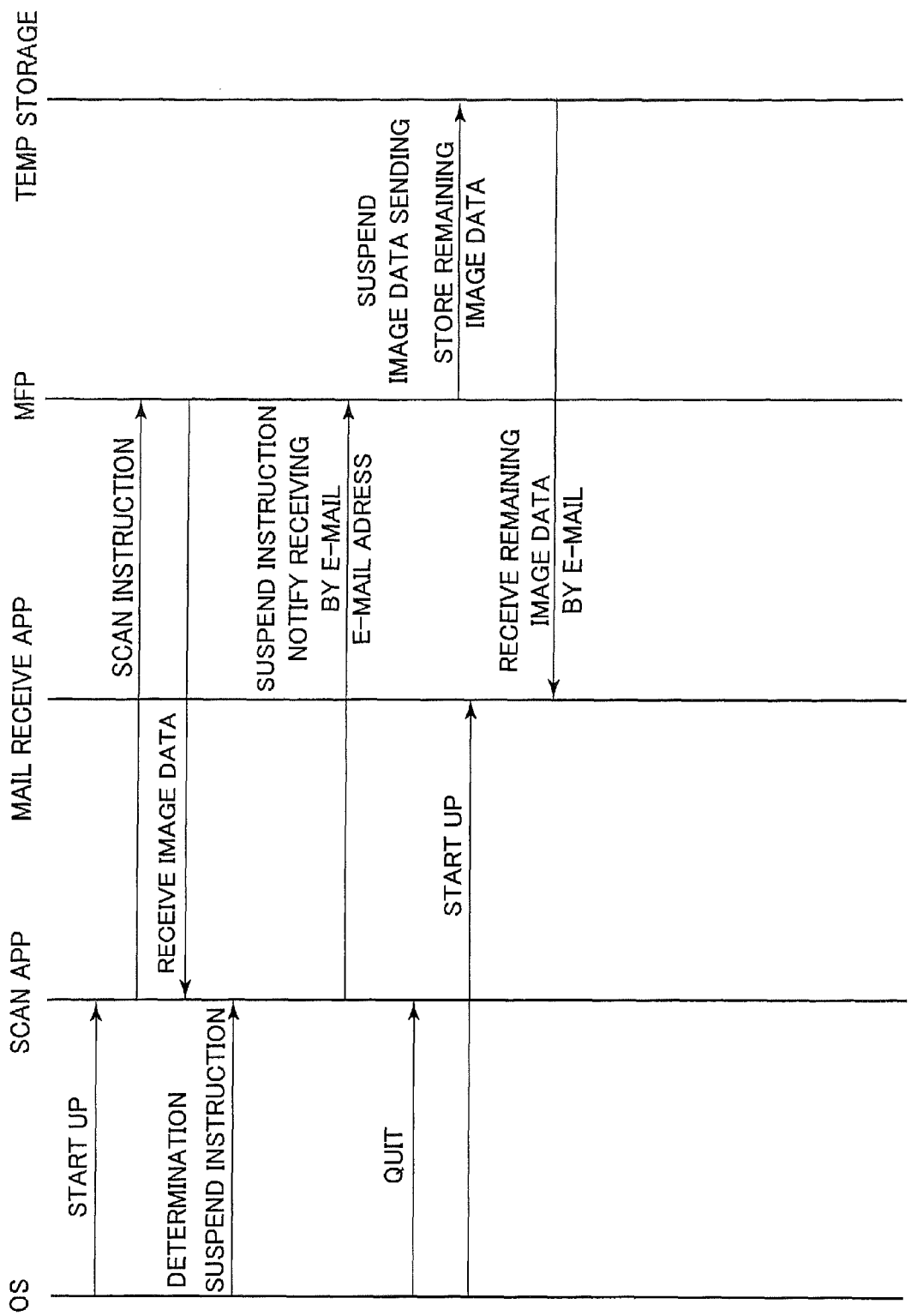
FIG. 5 shows a sequence diagram for explanation pertaining to the behavior of the image processing system, in case that the type of the another application after the switching is a mail receiving application, in the first situation.
Figure 6:
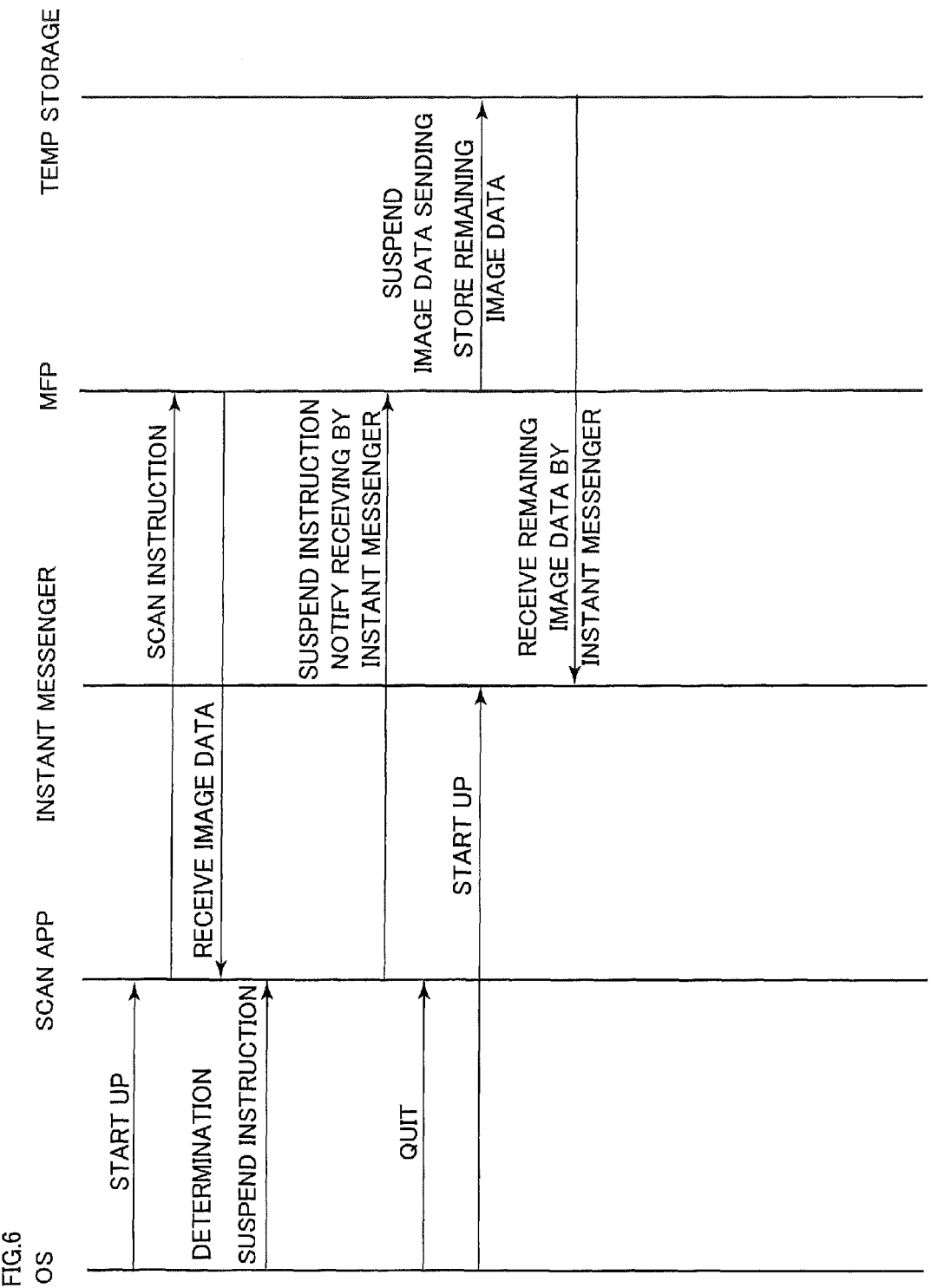
FIG. 6 shows a sequence diagram for explanation pertaining to the behavior of the image processing system, in case that the type of the another application after the switching is an instant messenger, in the first situation.

(1-1) In Case that the Type of the Another Application after the Switching is a Browser FIG. 4 shows a sequence diagram for explanation pertaining to the behavior of the image processing system, in case that the type of the another application after the switching is a browser, in the first situation. In FIGS. 4 to 6, the temporary storing destination shall be the MFP. In FIGS. 4 to 6, the temporary storing destination is an equipment other than the terminal device and can be communicated with both the terminal device and the MFP. The temporary storing destination may be cloud server 300-1 (FIG. 1) or the like.

Referring to FIG. 4, the OS of the terminal device starts up the scan application. When the scan application receives an instruction of performing a scan job, the scan application instructs the MFP to scan the document. The MFP scans the document, and transmits the image data of the document to the scan application. The scan application receives the image data from the MFP.

During the scan application receives the image data from the MFP, the OS receives a switching operation for switching the working application in the terminal device from the scan application to the browser from the user. The OS determines whether the image data can be received via the browser or not. The OS determines that the image data can be received. The OS instructs the scan application to suspend the process and notifies the scan application that the remaining image data will be received using the browser (the type of the application used for receiving the unreceived part).

After receiving the suspend instruction, the scan application moves from the active state to the background state, and transmits a code to the MFP. The code includes an instruction to suspend transmitting image data and notification to receive the remaining image data by the browser (the communication method which the next application being started up has).

After receiving the code, the MFP suspends transmitting the image data and informs the scan application of the information of the temporary storing destination of the remaining image data (for example, URL (Uniform Resource Locator) or the like). Next, the MFP stores the remaining image data in the temporary storing destination as substitute for transmitting the data to the scan application.

When the scan application receives the information of the temporary storing destination from the MFP, the scan application informs the OS of the information of the temporary storing destination. The OS quits the scan application after receiving the information of the temporary storing destination from the scan application. The scan application moves from the background state to the suspend state.

The OS starts up the browser after quitting the scan application. Herewith, the working application in the terminal device is switched from the scan application to the browser. The browser becomes active. The OS sets the temporary storing destination as the access destination of the browser. The browser accesses the temporary storing destination, and receives (downloads) the remaining image data from the temporary storing destination.

In the first situation, in case that the another application after the switching is a browser, the terminal device receives the remaining image data via the browser.

(1-2) In Case that the Type of the Another Application after the Switching is a Mail Receiving Application FIG. 5 shows a sequence diagram for explanation pertaining to the behavior of the image processing system, in case that the type of the another application after the switching is a mail receiving application, in the first situation.

Referring to FIG. 5, in a manner similar to FIG. 4, the OS receives a switch operation for switching the working application in the terminal device from the scan application to a mail receiving application from a user, during the scan application receives image data from the MFP. The OS determines whether the image data can be received or not via the mail receiving application. The OS determines that the image data can be received. The OS instructs the scan application to suspend processes, and to receive the remaining image data by using the mail receiving application.

When the scan application receives the suspend instruction, the scan application moves from the active state to the background state, and transmits a code to the MFP. The code includes an instruction to suspend transmitting the image data and a notification for receiving the remaining image data by using the mail receiving application. The scan application transmits the mail address of the terminal device with the code to the MFP.

After the scan application sends the code, the OS quits the scan application. The scan application moves to the background state to the suspend state. After the scan application is quitted, the OS starts up the mail receiving application. Herewith, the working application in the terminal device is switched from the scan application to the mail receiving application, and the mail receiving application becomes active.

After receiving the code, the MFP suspends sending the image data, and stores the remaining image data in the temporary storing destination, instead of transmitting the data to the scan application. After the remaining image data is stored, the temporary storing destination (the MFP) transmits the remaining image data to the mail address of the terminal device by e-mail. The mail receiving application receives the remaining image data.

In the first situation, in case that the another application after the switching is a mail receiving application, the terminal device receives the remaining image data by e-mail.

(1-3) In Case that the Type of the Another Application after the Switching is an Instant Messenger FIG. 6 shows a sequence diagram for explanation pertaining to the behavior of the image processing system, in case that the type of the another application after the switching is an instant messenger, in the first situation. In FIG. 6, it is supposed that the temporary storing destination (the MFP) is set as the destination of communication by the instant messenger.

Referring to FIG. 6, in a manner similar to FIG. 4, the OS receives a switch operation for switching the working application in the terminal device from the scan application to an instant messenger from the user, during the scan application receives image data from the MFP. The OS determines whether the image data can be received or not via the instant messenger. The OS determines that the image data can be received. The OS instructs the scan application to suspend processes, and to receive the remaining image data by using the instant messenger.

When the scan application receives the suspend instruction, the scan application moves from the active state to the background state, and transmits a code to the MFP. The code includes an instruction to suspend transmitting the image data and a notification for receiving the remaining image data by using the instant messenger.

After the scan application sends the code, the OS quits the scan application. The scan application moves to the background state to the suspend state.

After the scan application is quitted, the OS starts up the instant messenger. Herewith, the working application in the terminal device is switched from the scan application to the instant messenger, and the instant messenger becomes active.

After receiving the code, the MFP suspends sending the image data, and stores the remaining image data in the temporary storing destination, instead of transmitting the data to the scan application. After the remaining image data is stored, the temporary storing destination (the MFP) transmits the remaining image data by the instant messenger. The instant messenger receives the remaining image data from the MFP.

Hence, the terminal device receives the remaining image data from the predetermined source by the instant messenger.

(1-4) In Case that the Type of the Another Application after the Switching is Unknown or the Application Other than the Above Mentioned Applications (Hereinafter, which May be Referred to as the Applications which can not Perform Communication)

Figure 7:
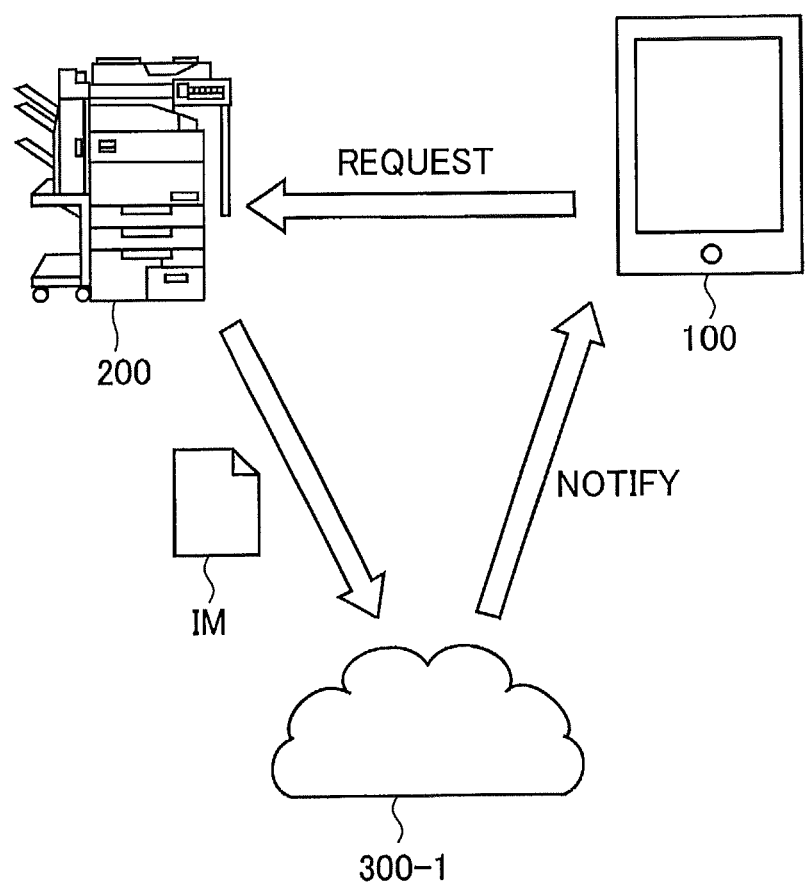
FIG. 7 conceptually shows the behavior of the image processing system, in case that image data IM cannot be received via the another application after the switching, in the first situation.

FIG. 7 conceptually shows the behavior of the image processing system, in case that image data IM cannot be received via the another application after the switching, in the first situation. In FIGS. 7 and 8, the temporary storing destination shall be cloud server 300-1. In FIG. 7, the temporary storing destination is an equipment other than the terminal device and can be communicated with both the terminal device and the MFP. The temporary storing destination may be the MFP.

Referring to FIG. 7, in case that the type of the another application after the switching is an application which can not perform communication, image data IM cannot be received via the another application after the switching. In this instance, terminal device 100 requests MFP 200 to store the remaining image data IM in cloud server 300-1. MFP 200 stores the remaining image data IM in cloud server 300-1, in response to the request from terminal device 100. After the storing, cloud server 300-1 notifies the completion of storing the remaining image data. Terminal device 100 displays the notification for the scan application on the display unit, when the notification from MFP 200 is received.

Other than the notification of the completion of storing the remaining image data by the application notification, it can be performed by arbitrary way, for example, by lighting-up a LED (Light Emitting Diode) lamp in the terminal device.

After that, terminal device 100 starts up the scan application in accordance with operations of the user, and receives the remaining image data from cloud server 300-1.

FIG. 8 shows a sequence diagram for explanation pertaining to the behavior of the image processing system in case that the type of the another application after the switching is an application which cannot perform communication, in the first situation.

Referring to FIG. 8, in a manner similar to FIG. 4, the OS receives a switch operation for switching the working application in the terminal device from the scan application to an application which cannot perform communication from a user, during the scan application receives image data from the MFP. The OS determines whether the image data can be received or not via the application which cannot perform communication. The OS determines that the image data cannot be received. The OS instructs the scan application to suspend processes, and informs the scan application that the remaining image data cannot be received by using the application after the switching.

When the scan application receives the suspend instruction, the scan application moves from the active state to the background state, and transmits a code to the MFP. The code includes an instruction to suspend transmitting the image data and a demand for storing the remaining image data in the temporary storing destination.

After the scan application sends the code, the OS quits the scan application. The scan application moves to the background state to the suspend state. After the scan application is quitted, the OS starts up the application which cannot perform communication. Herewith, the working application in the terminal device is switched from the scan application to the application which cannot perform communication, and the application which cannot perform communication becomes active.

After receiving the code, the MFP suspends sending the image data, and stores the remaining image data in the temporary storing destination, instead of transmitting the data to the scan application. After the remaining image data is stored, the temporary storing destination notifies the terminal device of the completion of storing the remaining image data. When the terminal device receives the notification from the temporary storing destination, the terminal device displays the notification for the scan application on the display unit.

The user who saw the notification for the application starts up the scan application. Receiving the operation, the OS quits the application which can not perform communication, and starts up the scan application. Herewith, the working application in the terminal device is switched from the application which can not perform communication to the scan application again. The scan application becomes active. The scan application which was started up receives the remaining image data from the temporary storing destination.

The OS may automatically start up the scan application without receiving operations for starting up the scan application from the user, when receiving the notification of the completion of storing the remaining image data. The OS may start up the scan application after a predetermined time has elapsed since receiving the notification of the completion of storing the remaining image data, for example. The OS may or may not display the notification for the application on the display unit in case that scan application is automatically started up.

(2) The Second Situation

Figure 9A:
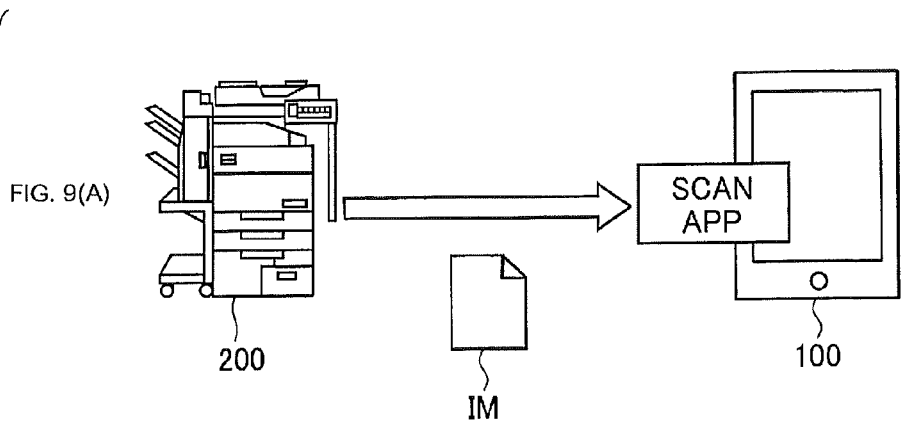
FIGS. 9(A)-9(C) are for explanation pertaining to the behavior of the image forming system in case that image data IM can be received via the another application after the switching in the second situation.
Figure 9B:
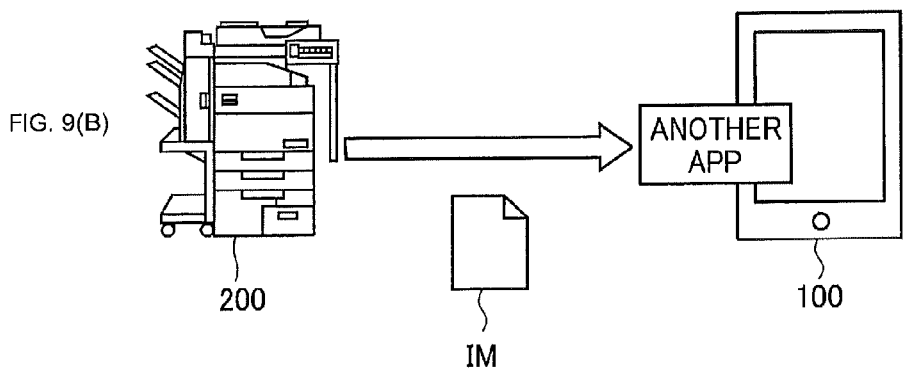
Figure 9C:
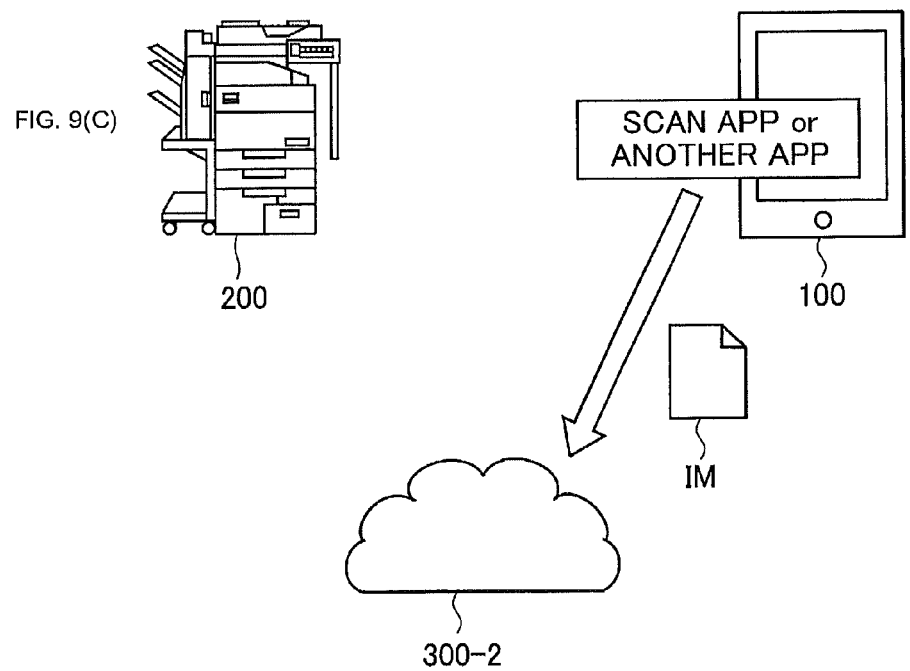

FIG. 9(A)-9(C) are for explanation pertaining to the behavior of the image forming system in case that image data IM can be received via the another application after the switching in the second situation.

Referring to FIG. 9(A), the second situation is as the following. Terminal device 100 receives an instruction of performing a scan job from a user of terminal device 100. The scan job is to scan documents by MFP 200 (an example of an image processing device in the second situation), and upload the acquired image data of the documents to cloud server 300-2 (the final storing destination). Terminal device 100 receives an operation from the user for switching the working application in terminal device 100 to the another application, during receiving image data IM of the documents scanned by MFP 200 via the scan application.

In the second situation, terminal device 100 suspends receiving image data IM. Terminal device 100 determines whether image data IM can be received or not via the another application after the switching.

In case that the type of the another application is a browser, a mail receiving application, or an instant messenger, image data IM can be received via the another application. In this instance, terminal device 100 restarts (continues) the communication with MFP 200 via the another application and receives the remaining image data IM, as seen from FIG. 9(B).

After receiving the remaining image data IM, terminal device 100 logs in cloud server 300-2 via the scan application or the another application, and uploads image data IM as seen from FIG. 9(C).

It is assumed that the final storing destination is cloud server 300-2 in the second situation.

Figure 10:
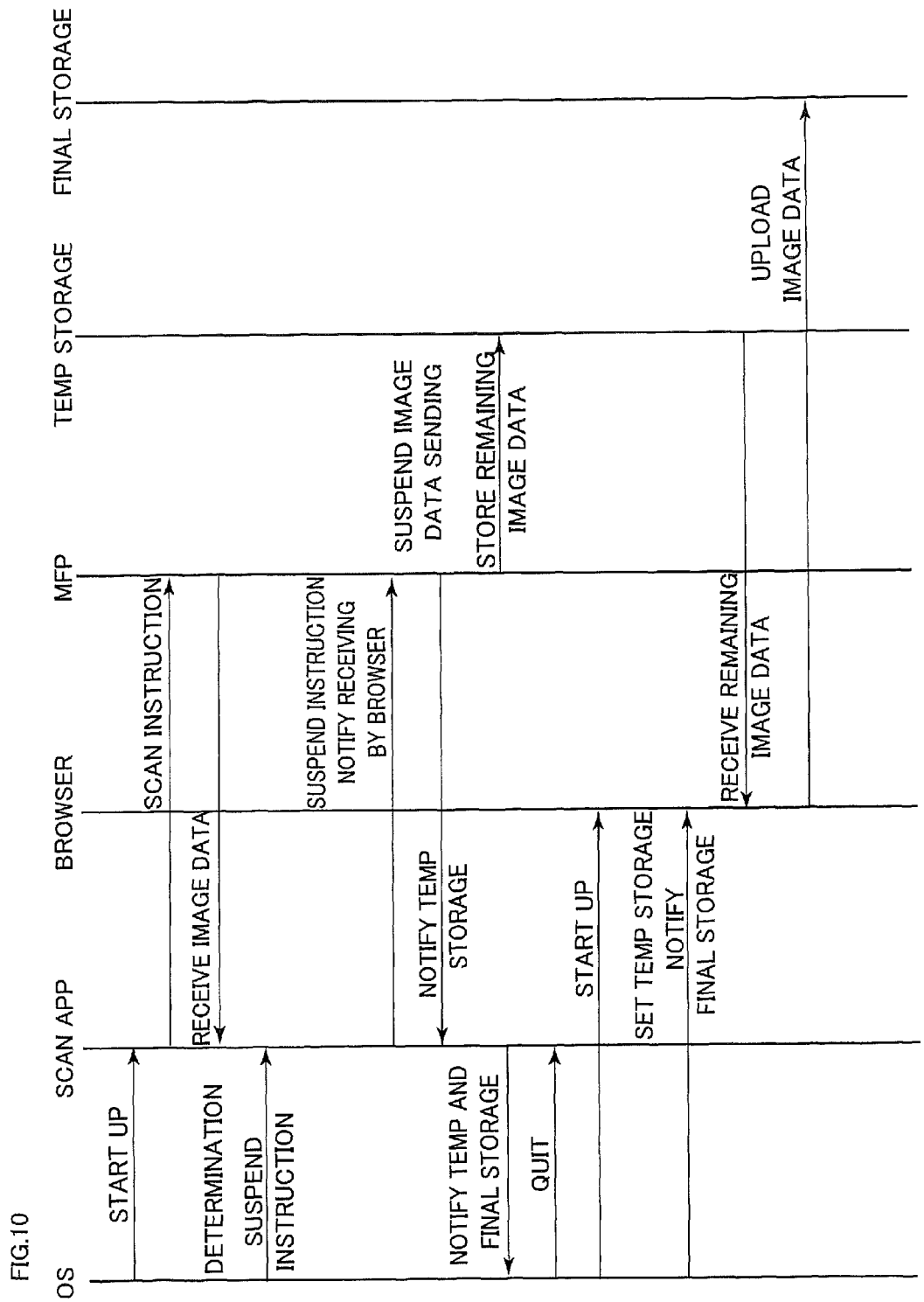
FIG. 10 shows a sequence diagram for explanation pertaining to the behavior of the image processing system, in case that the type of the another application after the switching is a browser, in the second situation.
Figure 11:
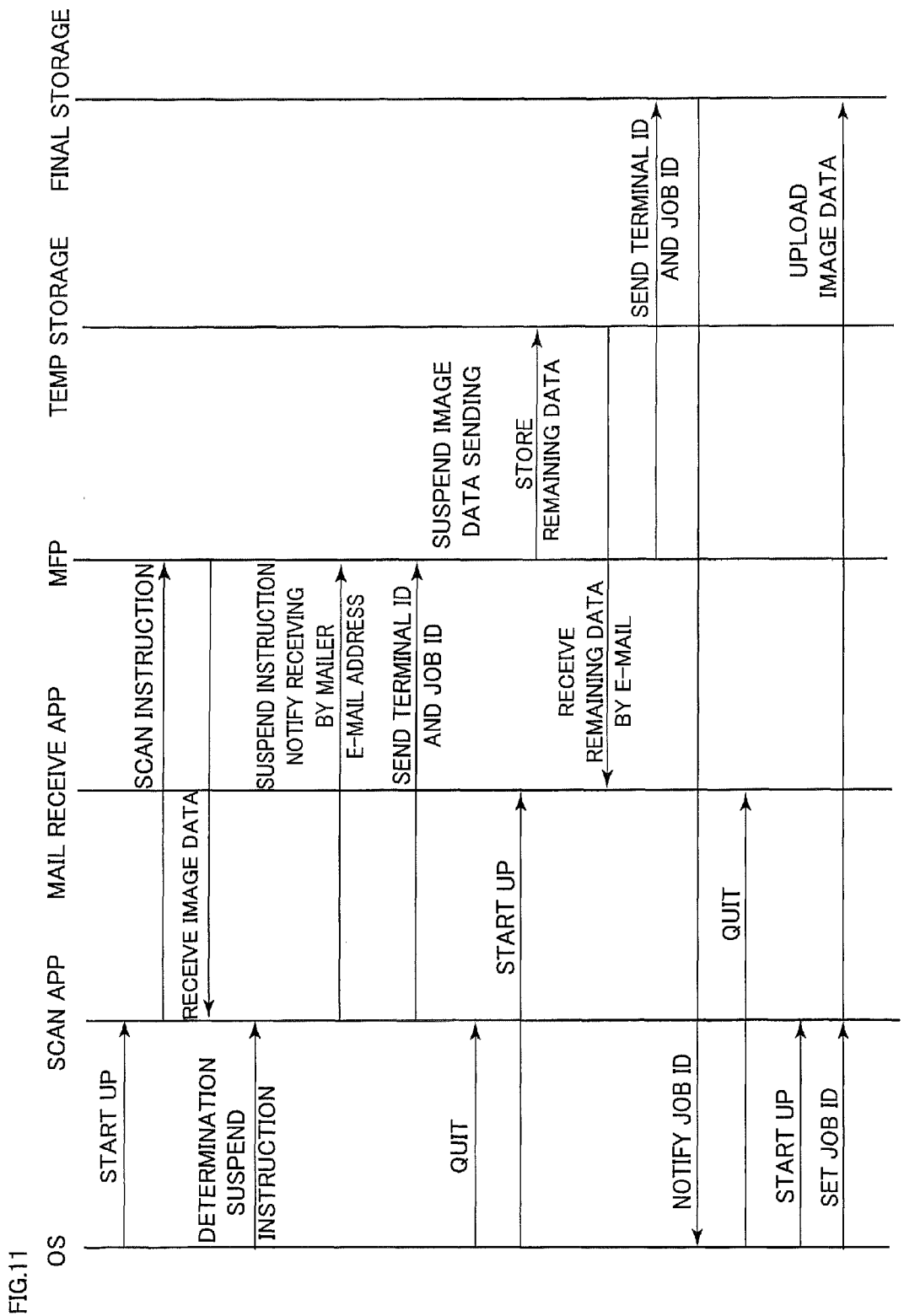
FIG. 11 shows a sequence diagram for explanation pertaining to the behavior of the image processing system, in case that the type of the another application after the switching is a mail receiving application, in the second situation.
Figure 12:
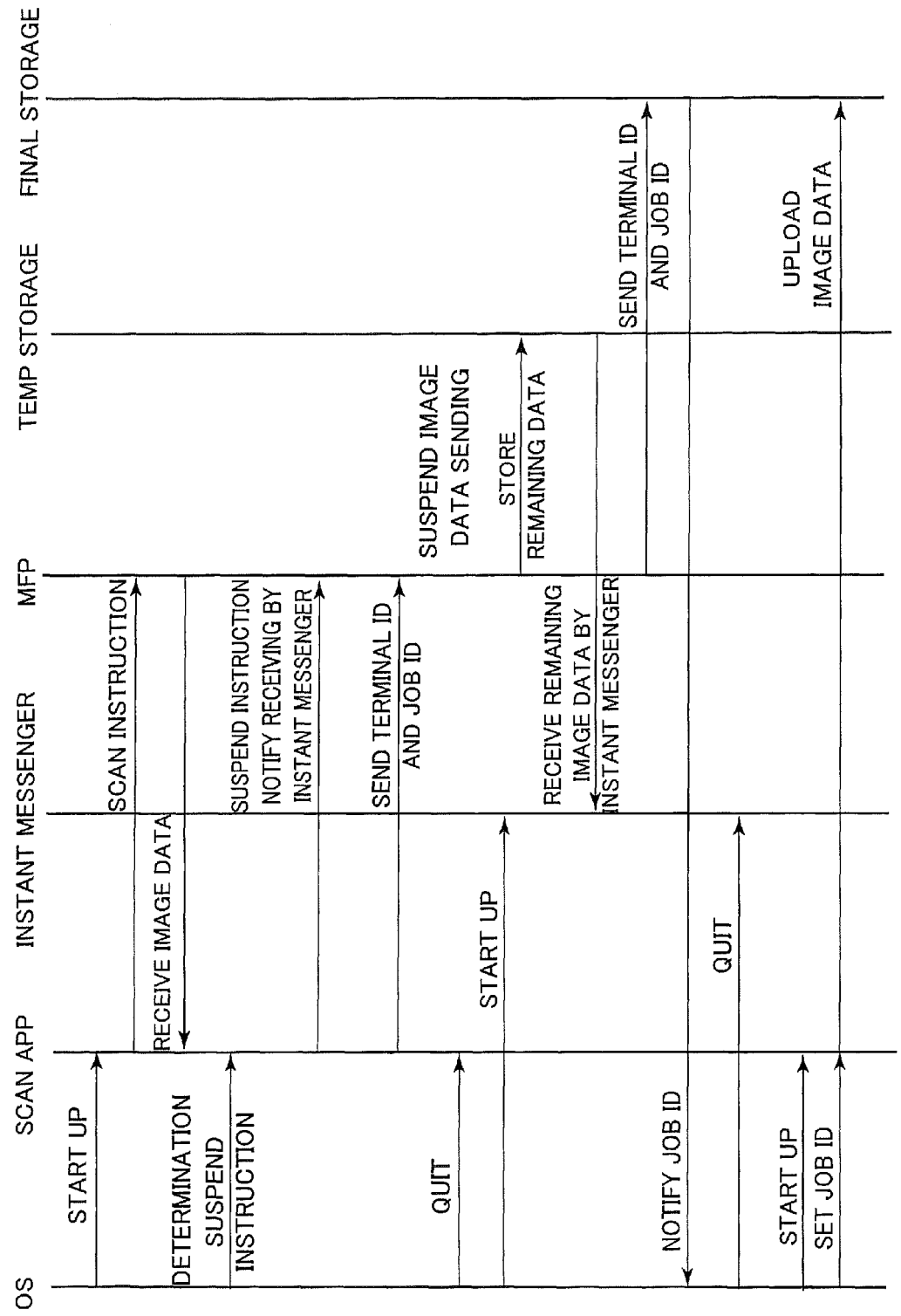
FIG. 12 shows a sequence diagram for explanation pertaining to the behavior of the image processing system, in case that the type of the another application after the switching is an instant messenger, in the second situation.

(2-1) In Case that the Type of the Another Application after the Switching is a Browser FIG. 10 shows a sequence diagram for explanation pertaining to the behavior of the image processing system, in case that the type of the another application after the switching is a browser, in the second situation. In FIGS. 10 to 12, the temporary storing destination shall be the MFP. In FIGS. 10 to 12, the temporary storing destination is an equipment other than the terminal device and can be communicated with both the terminal device and the MFP. The temporary storing destination may be cloud server 300-1 (FIG. 1) or the like.

Referring to FIG. 10, since the processes during the terminal device receives an instruction of performing a scan job and the scan application transmits the code to the MFP are similar to the first situation of FIG. 4, the explanation is not repeated.

After the MFP receives the code, the MFP suspends transmitting the image data and notifies the scan application of the information of the temporary storing destination of the remaining image data. The MFP stores the remaining image data in the temporary storing destination instead of transmitting the data to the scan application.

When the scan application receives the information of the temporary storing destination from the MFP, the scan application notifies the OS of the information of the temporary storing destination and the final storing destination. The OS quits the scan application when receiving the information of the temporary storing destination and the final storing destination from the scan application. The scan application moves from the background state to the suspend state.

After quitting the scan application, the OS starts up the browser. Herewith, the working application in the terminal device is switched from the scan application to the browser, and the browser becomes active. The OS sets the temporary storing destination as the access destination of the browser, and notifies the browser of the information of the final storing destination.

By accessing the temporary storing destination, the browser downloads the remaining image data from the temporary storing destination. The browser uploads the image data to the final storing destination after the completion of the downloading the image data, based on the information notified.

(2-2) In Case that the Type of the Another Application after the Switching is a Mail Receiving Application FIG. 11 shows a sequence diagram for explanation pertaining to the behavior of the image processing system, in case that the type of the another application after the switching is a mail receiving application, in the second situation.

Referring to FIG. 11, since the processes during the terminal device receives an instruction of performing a scan job and the scan application transmits the code and the mail address to the MFP are similar to the first situation of FIG. 5, the explanation is not repeated.

When the scan application transmits the code and the mail address to the MFP, the scan application further transmits the terminal ID and the job ID to the MFP.

The terminal ID is information to identify the terminal device. The job ID is information to identify the scan job being executed (the job to store the image data of the scanned document in the final storing destination).

The OS quits the scan application after the scan application transmits the code, the mail address, the terminal ID, and the job ID. The scan application moves from the background state to the suspend state. The OS starts up the mail receiving application, after the completion of quitting the scan application. Herewith, the working application in the terminal device is switched from the scan application to the mail receiving application. The mail receiving application becomes active.

When the MFP receives the code, the MFP suspends transmitting the image data, and stores the remaining image data in the temporary storing destination instead of transmitting the data to the scan application. After the completion of storing the remaining image data, the temporary storing destination (the MFP) transmits the remaining image data to the mail address of the terminal device. The mail receiving application receives the remaining image data.

After the completion of storing the remaining image data, the MFP transmits the device ID and the job ID received from the terminal device to the final storing destination. When receiving the device ID and the job ID, the final storing destination notifies the job ID to the OS of the identified terminal device based on the received device ID. When receiving the notification of the job ID, the OS of the terminal device displays the notification on the display unit as the notification for the application.

Other than the notification of receiving the job ID by the notification for the application, it can be performed by arbitrary way, for example, by lighting-up a LED lamp in the terminal device.

When the user saw the notification for the application, the user starts up the scan application. When receiving the operation, the OS quits the mail receiving application and starts up the scan application (switches the working application in the terminal device to the scan application). Herewith, the working application in the terminal device is switched from the mail receiving application to the scan application again. The scan application becomes active. The OS sets the job ID to the scan application. The scan application accesses the final storing destination based on the job ID, and uploads the image data to the final storing destination.

The OS may automatically start up the scan application without receiving operations for starting up the scan application from users, when receiving the notification of the job ID. The OS may start up the scan application after a predetermined time has elapsed since receiving the notification of the job ID, for example. The OS may or may not display the notification for the application on the display unit in case that the scan application is automatically started up. The same holds for the following sequence diagram of FIG. 12.

(2-3) In Case that the Type of the Another Application after the Switching is an Instant Messenger FIG. 12 shows a sequence diagram for explanation pertaining to the behavior of the image processing system, in case that the type of the another application after the switching is an instant messenger, in the second situation. In FIG. 12, it is supposed that the temporary storing destination (the MFP) is set as the destination of communication by the instant messenger.

Referring to FIG. 12, since the processes during the terminal device receives an instruction of performing a scan job and the scan application transmits the code to the MFP are similar to the first situation of FIG. 6, the explanation is not repeated.

When the scan application transmits the code to the MFP, the scan application further transmits the terminal ID and the job ID to the MFP.

The OS quits the scan application after the scan application transmits the code, the terminal ID, and the job ID. The scan application moves from the background state to the suspend state. The OS starts up the instant messenger, after the completion of quitting the scan application. Herewith, the working application in the terminal device is switched from the scan application to the instant messenger. The instant messenger becomes active.

When the MFP receives the code, the MFP suspends transmitting the image data, and stores the remaining image data in the temporary storing destination instead of transmitting the data to the scan application. After the completion of storing the remaining image data, the temporary storing destination (the MFP) transmits the remaining image data by using the instant messenger. The instant messenger receives the remaining image data from the MFP.

After the completion of storing the remaining image data, the MFP transmits the device ID and the job ID received from the terminal device to the final storing destination. When receiving the device ID and the job ID, the final storing destination notifies the job ID to the OS of the identified terminal device based on the received device ID. When receiving the notification of the job ID, the OS displays the notification on the display unit, as the notification for the application.

When the user saw the notification for the application, the user starts up the scan application. When receiving the operation, the OS quits the instant messenger and starts up the scan application. Herewith, the working application in the terminal device is switched from the instant messenger to the scan application again. The scan application becomes active. The OS sets the job ID to the scan application. The scan application accesses the final storing destination based on the job ID, and uploads the image data to the final storing destination.

(2-4) In Case that the Type of the Another Application after the Switching is the Application which Cannot Perform Communication In case that the type of the another application after the switching is the application which can not perform communication, since the processes during the terminal device receives an instruction of performing a scan job and the scan application receives the remaining image data from the temporary storing destination are similar to the behavior of FIG. 7, the explanation is not repeated. After that, the scan application uploads the image data to the final storing destination in accordance with the operations of the user.

(3) The Third Situation

Figure 13:
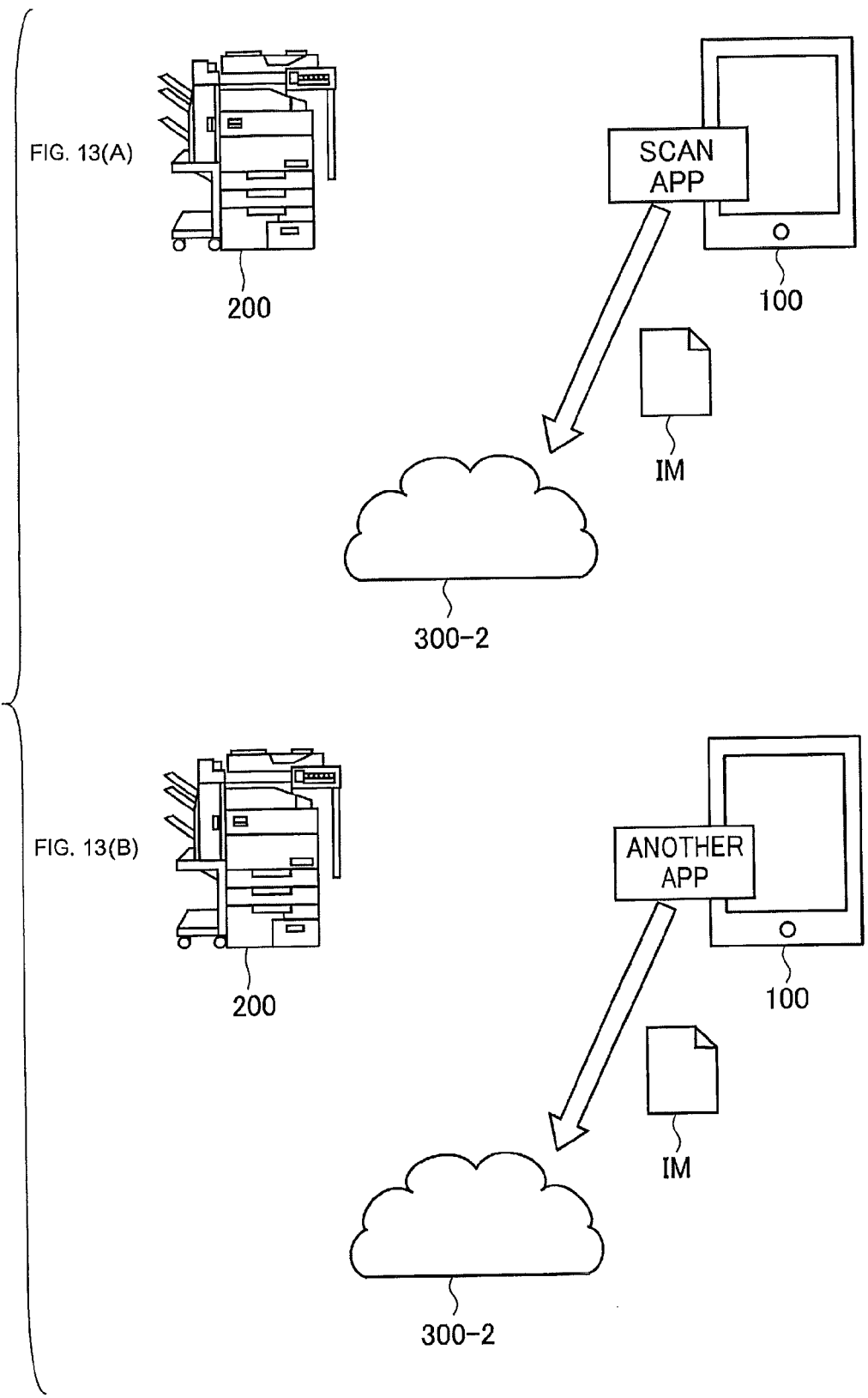
FIGS. 13(A) and 13(B) are for explanation pertaining to the behavior of the image forming system in case that image data IM can be uploaded via the another application after the switching in the third situation.

FIG. 13(A) and FIG. 13(B) are for explanation pertaining to the behavior of the image forming system in case that image data IM can be uploaded via the another application after the switching in the third situation.

Referring to FIG. 13(A), the third situation is as the following. Terminal device 100 received an instruction of performing a scan job from a user of terminal device 100. The scan job is to scan documents by MFP 200, and upload (transmit) the acquired image data of the documents to cloud server 300-2 (the final storing destination, an example of an image processing device in the third situation). Terminal device 100 receives an operation from the user for switching the working application in terminal device 100 to the another application, during uploading image data IM of the documents to cloud server 300-2 via the scan application.

In the third situation, terminal device 100 suspends uploading image data IM. Terminal device 100 determines whether image data IM can be uploaded or not via the another application.

In case that the type of the another application after switching is a browser, image data IM can be uploaded via the another application. In this instance, terminal device 100 restarts (continues) the communication with cloud server 300-2 via the another application after switching and uploads the remaining image data IM to cloud server 300-2 (the final storing destination), as seen from FIG. 13(B).

Figure 14:
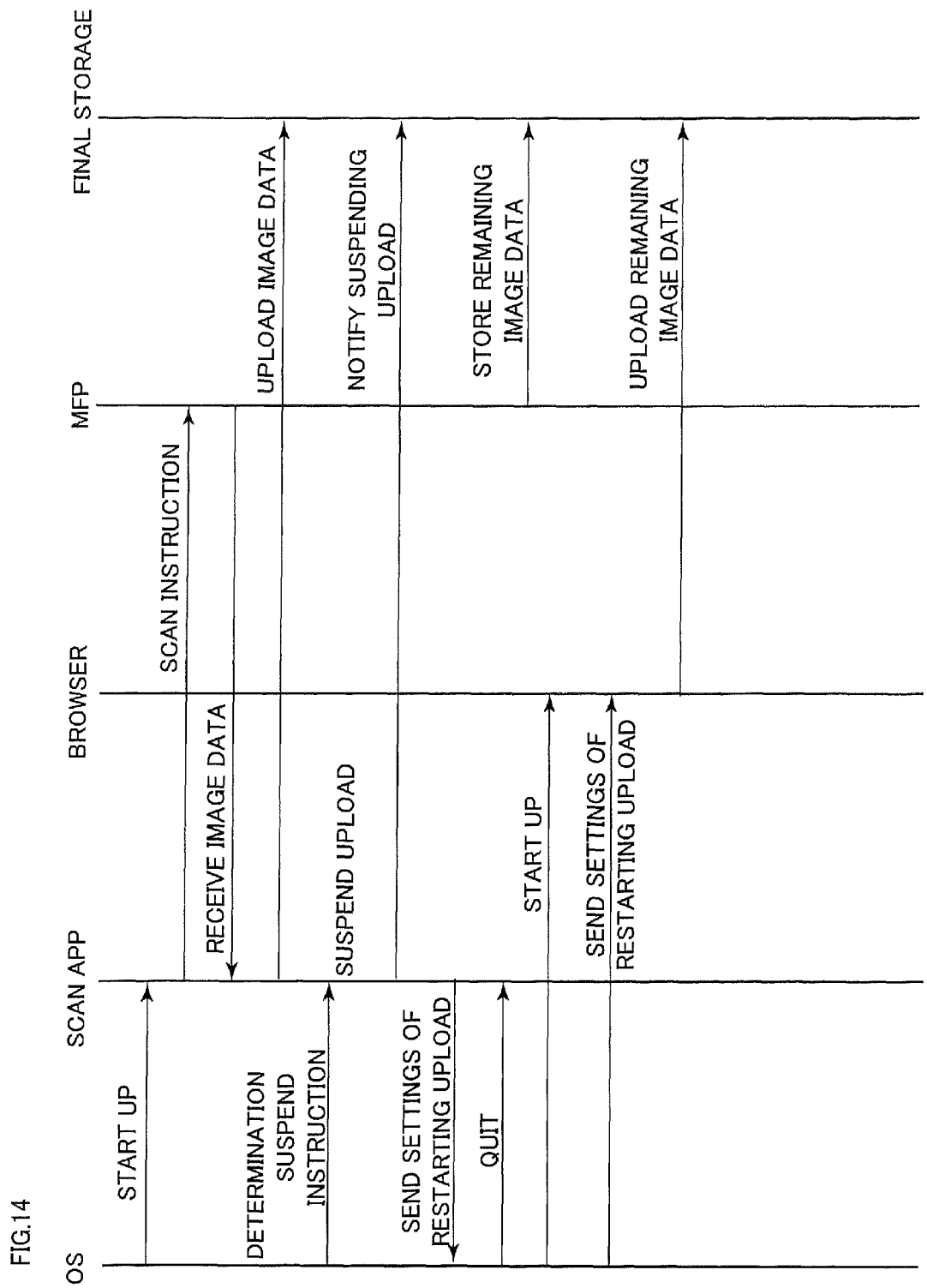
FIG. 14 shows a sequence diagram for explanation pertaining to the behavior of the image processing system, in case that the type of the another application after the switching is a browser, in the third situation.

(3-1) In Case that the Type of the Another Application after the Switching is a Browser FIG. 14 shows a sequence diagram for explanation pertaining to the behavior of the image processing system, in case that the type of the another application after the switching is a browser, in the third situation.

Referring to FIG. 14, the OS of the terminal device starts up the scan application. When the scan application receives an instruction of performing a scan job, the scan application instructs the MFP to scan the document. The MFP scans the document, and transmits the image data of the document to the scan application. The scan application receives the image data from the MFP. The scan application starts uploading the image data to the final storing destination after the completion of receiving the image data.

During the scan application uploads the image data to the final storing destination, the OS receives a switching operation for switching the working application in the terminal device from the scan application to the browser from the user. The OS determines whether the image data can be uploaded via the browser or not. The OS determines that the image data can be uploaded. The OS instructs the scan application to suspend the process and notifies the scan application that the remaining image data will be uploaded using the browser.

After receiving the suspend instruction, the scan application moves from the active state to the background state and notifies the MFP that the uploading the image data should be interrupted (suspended). The scan application transmits the settings for restarting of uploading the image data on startup to the OS. After receiving the settings from the scan application, the OS quits the scan application. The scan application moves from the background state to the suspend state The OS starts up the browser after quitting the scan application. Herewith, the working application in the terminal device is switched from the scan application to the browser. The browser becomes active. The OS sends the settings for restarting of the uploading the image data to the browser. The browser accesses the final storing destination in accordance with the settings, and uploads the remaining image data to the final storing destination.

In the third situation, in case that the another application is a browser, the terminal device automatically continues uploading the image data via the browser when the browser starts up.

(3-2) In Case that the Type of the Another Application after the Switching is a Mail Transmitting Application, an Instant Messenger, or an Application which Cannot Perform Communication In case that the type of the another application after the switching is a mail transmitting application, an instant messenger, or an application which cannot perform communication, since the processes during the terminal device receives an instruction of performing a scan job and the scan application begins to upload the image data to the final storing destination are similar to the behavior of FIG. 14, the explanation is not repeated.

During the scan application uploads the image data to the final storing destination, the OS receives the operation to switch the working application in the terminal device from the scan application to the mail transmitting application, the instant messenger, or the application which cannot perform communication from a user. The OS determines whether the image data can be uploaded or not, via the application after the switching. The OS determines that the image data cannot be uploaded. The OS configures the settings of the scan application to synchronize the image data stored in the terminal device and the image data stored in the final storing destination, by using the synchronization function of the scan application.

After the quitting of the scan application, the OS starts up the application after the switching. The OS quits the application after the switching in accordance with the operations of the user, and starts up the scan application. Herewith, the working application in the terminal device is switched to the scan application again. The scan application becomes active. The scan application uploads the remaining image data to the final storing destination by copying the image data stored in the terminal device to the final storing destination, in accordance with the settings.

(4) The Fourth Situation

Figure 15:
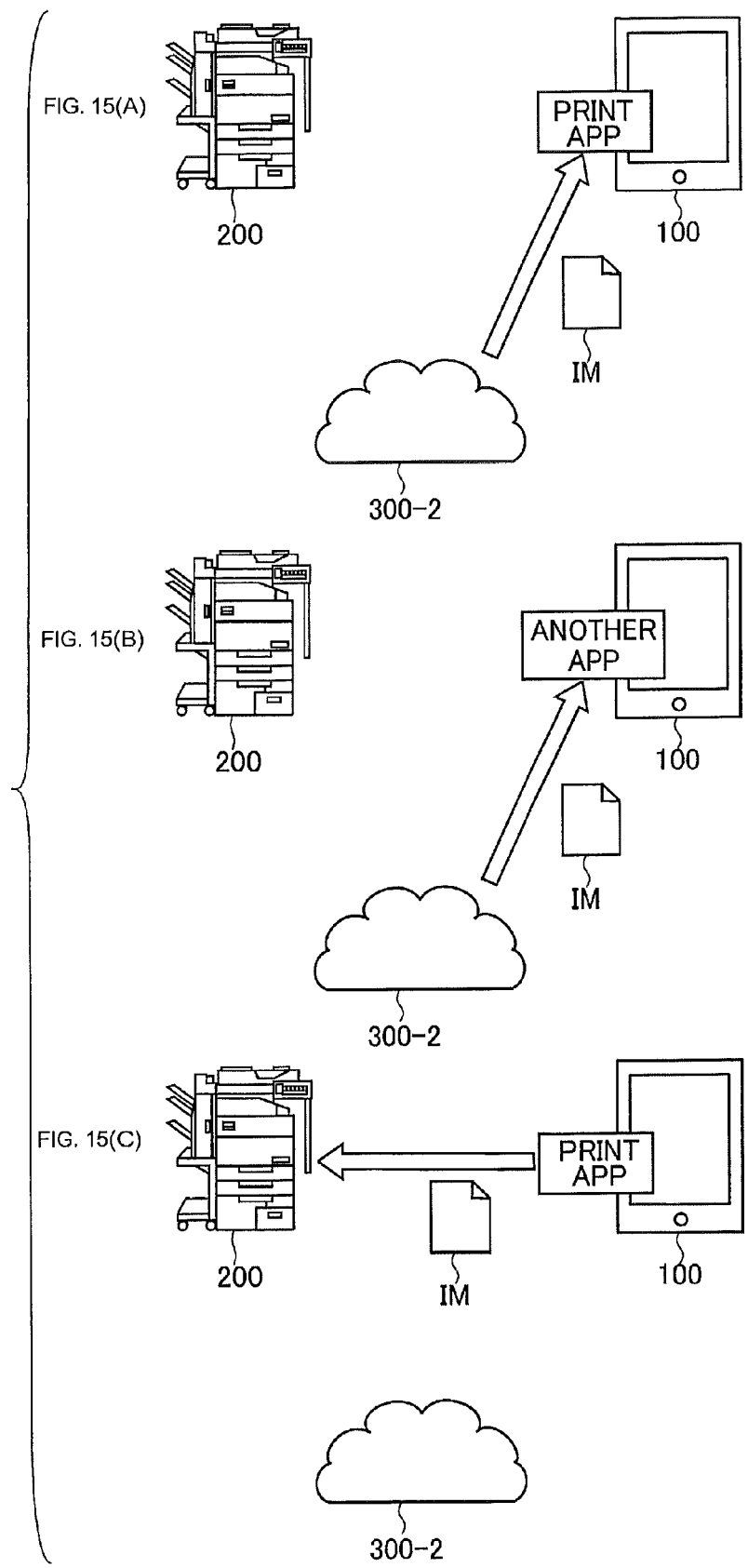
FIGS. 15(A)-15(C) are for explanation pertaining to the behavior of the image forming system in case that image data IM can be downloaded via the another application after the switching in the fourth situation.

FIG. 15(A)-15(B) are for explanation pertaining to the behavior of the image forming system in case that image data IM can be downloaded via the another application after the switching in the fourth situation.

Referring to FIG. 15(A), the fourth situation is as the following. Terminal device 100 receives an instruction of performing a print job from a user of terminal device 100. The print job is to download (receive) the image data stored in cloud server 300-2 (the sources, an example of an image processing device in the fourth situation) to terminal device 100. The downloaded image data is transmitted to the MFP and printed by the MFP. Terminal device 100 receives an operation from the user for switching the working application in terminal device 100 to the another application, during downloading image data IM from cloud server 300-2 via the print application.

In the fourth situation, terminal device 100 suspends downloading image data IM. Terminal device 100 determines whether image data IM can be received or not via the another application after the switching.

In case that the type of the another application after switching is a browser, image data IM can be received via the another application after the switching. In this instance, terminal device 100 restarts (continues) the communication with cloud server 300-2 via the another application and receives the remaining image data IM, as seen from FIG. 15(B). When the print application is started up again after the completion of the receiving the remaining image data IM, the terminal device 100 transmits an instruction of performing a print job and image data IM to MFP 200 via the print application, as seen from FIG. 15(C).

Figure 16:
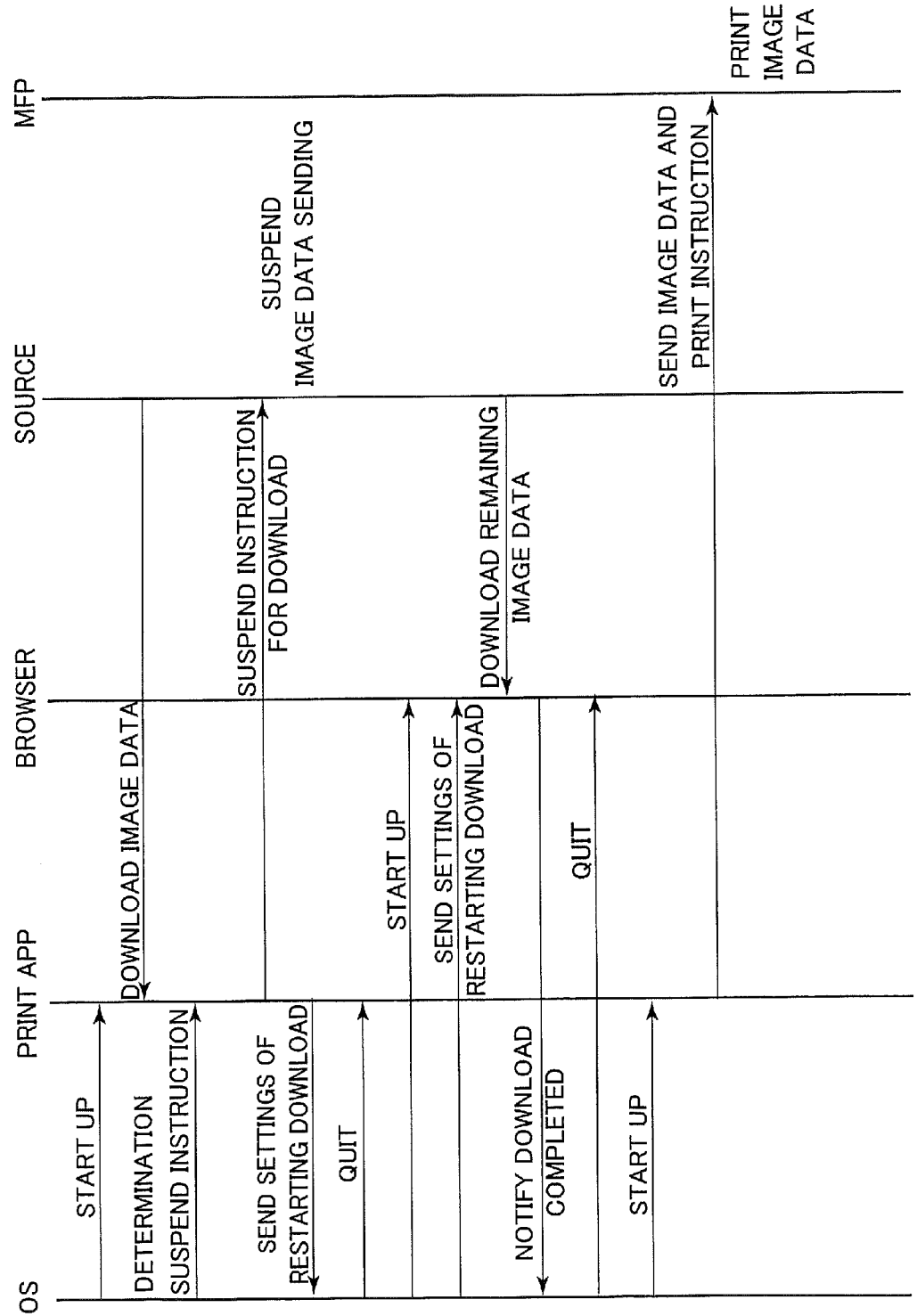
FIG. 16 shows a sequence diagram for explanation pertaining to the behavior of the image processing system, in case that the type of the another application after the switching is a browser, in the fourth situation.

(4-1) In Case that the Type of the Another Application after the Switching is a Browser FIG. 16 shows a sequence diagram for explanation pertaining to the behavior of the image processing system, in case that the type of the another application after the switching is a browser, in the fourth situation.

Referring to FIG. 16, the OS of the terminal device starts up the print application. When the print application receives an instruction of performing a print job, the print application starts downloading (receiving) the image data from the source.

During the print application downloads the image data from the source, the OS receives a switching operation for switching the working application in the terminal device from the print application to the browser from the user. The OS determines whether the image data can be downloaded via the browser or not. The OS determines that the image data can be downloaded. The OS instructs the print application to suspend the process and notifies the print application that the remaining image data will be downloaded using the browser.

After receiving the suspend instruction, the print application moves from the active state to the background state and notifies the source that the downloading the image data should be interrupted. When the source receives the notification of interrupting the download from the print application, the source suspends sending the image data. The print application transmits the settings for restarting the downloading the image data on start up to the OS. When the OS receives the settings from the print application, the OS quits the print application. The print application moves from the background state to the suspend state.

The OS starts up the browser after quitting the print application. Herewith, the working application in the terminal device is switched from the print application to the browser. The browser becomes active. The OS sends the settings for restarting of the uploading the image data to the browser. The browser accesses the source in accordance with the settings, and downloads the remaining image data.

After the completion of downloading the remaining image data, the browser notifies the OS that that the download was completed. When the OS receives the notification of the completion of the download, the OS displays the notification as the notification for the application on the display unit.

Other than the notification of the completion of downloading by the application notification, it can be performed by arbitrary way, for example, by lighting-up a LED (Light Emitting Diode) lamp in the terminal device.

When the user saw the notification for the application, the user starts up the print application. When receiving the operation, the OS quits the browser and starts up the print application. Herewith, the working application in the terminal device is switched from the browser to the print application again. The print application becomes active. The print application transmits the downloaded image data and the instruction to perform the printing to the MFP. The MFP prints out the received image data.

The OS may automatically start up the print application without receiving operations for starting up the print application from users, when receiving the notification of the completion of the downloading. The OS may start up the print application after a predetermined time has elapsed since receiving the notification of the completion of the downloading, for example. The OS may or may not display the notification for the application on the display unit in case that the print application is started up automatically.

(4-2) In Case that the Type of the Another Application after the Switching is a Mail Transmitting Application, an Instant Messenger, or an Application which Cannot Perform Communication In a manner similar to FIG. 14, the OS receives a switch operation for switching the working application in the terminal device from the print application to the mail transmitting application, the instant messenger, or the application which cannot perform communication, during the print application downloads the image data from the sources. The OS determines whether the image data can be downloaded via the application after the switching or not. The OS determines the image data cannot be downloaded.

The OS instructs the print application to suspend processes. The OS configures the print application's settings of restarting of downloading the image data from the source and transmitting the image data and the execution instruction for printing to the MFP when the print application starts up again.

After the quitting the print application, the OS starts up the application after the switching. The OS quits the application after the switching in accordance to operations of the user and starts up the print application. Herewith, the working application in the terminal device is switched to the print application again. The print application becomes active. The print application transmits the image data in accordance with the settings. The MFP prints out the image data received from the print application.

(5) The Fifth Situation

Figure 17:
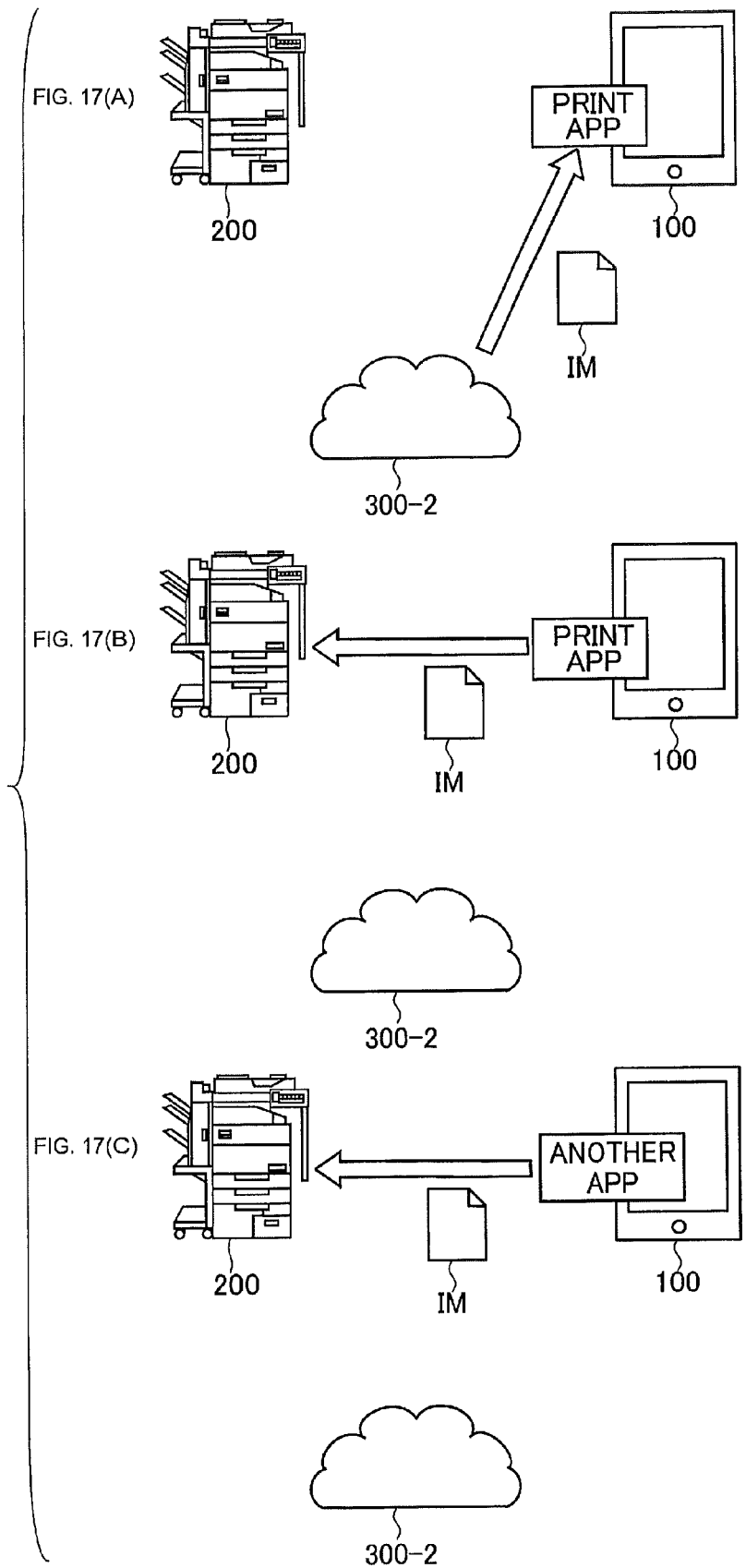
FIGS. 17(A)-17(C) are for explanation pertaining to the behavior of the image forming system in case that image data IM can be transmitted via the another application after the switching in the fifth situation.

FIG. 17(A)-17(C) are for explanation pertaining to the behavior of the image forming system in case that image data IM can be transmitted via the another application after the switching in the fifth situation. In the fifth situation, print jobs may be print jobs using the direct printing. The direct printing means the printing being executed via the print application installed in MFP 200.

Referring to FIG. 17(A), the fifth situation is as the following. Terminal device 100 receives an instruction of performing a print job from a user of terminal device 100. The print job is to download (receive) the image data stored in cloud server 300-2 (the sources) to terminal device 100. The downloaded image data is transmitted to the MFP 200 (an example of an image processing device in the fifth situation) and printed by the MFP 200. Terminal device 100 receives an operation from the user for switching the working application in terminal device 100 to the another application, during transmitting image data IM to MFP 200 via the print application, as shown in FIG. 17(B).

In the fifth situation, terminal device 100 suspends downloading image data IM. Terminal device 100 determines whether image data IM can be transmitted or not via the another application after the switching.

In case that the type of the another application after switching is the browser, the mail receiving application, or the instant messenger, image data IM can be transmitted via the another application after the switching. In this instance, terminal device 100 restarts (continues) the communication with MFP 200 via the another application and transmits the remaining image data IM, as seen from FIG. 17(C).

Figure 18:
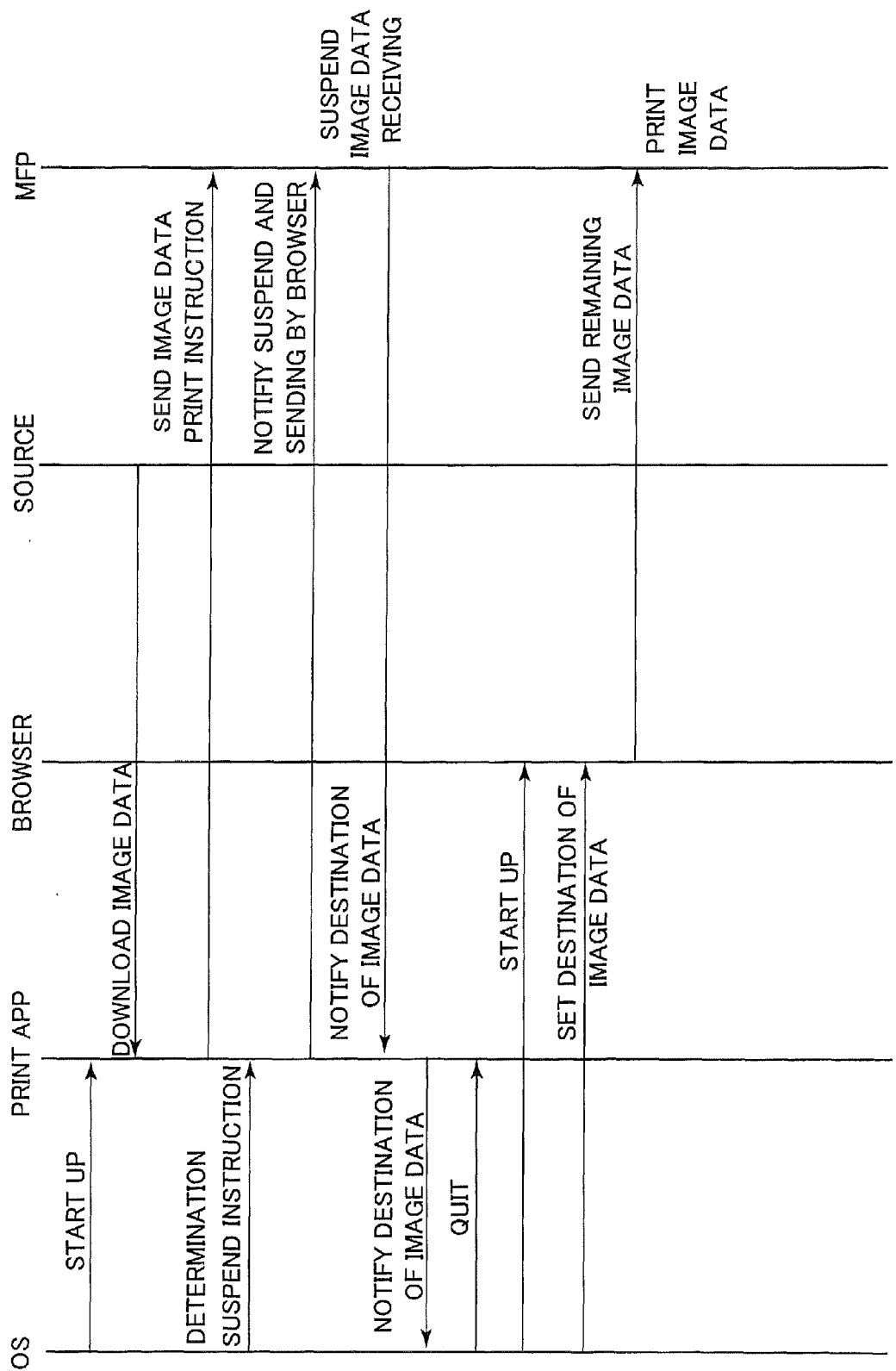
FIG. 18 shows a sequence diagram for explanation pertaining to the behavior of the image processing system, in case that the type of the another application after the switching is a browser, in the fifth situation.

(5-1) In Case that the Type of the Another Application after the Switching is a Browser FIG. 18 shows a sequence diagram for explanation pertaining to the behavior of the image processing system, in case that the type of the another application after the switching is a browser, in the fifth situation.

Referring to FIG. 18, the OS of the terminal device starts up the print application. When the print application receives the instruction of performing a print job, the print application downloads the image data from the sources. When the print application finishes the download of the image data, the print application transmits the image data and the instruction of performing the print job to the MFP.

During the print application transmits the image data to the MFP, the OS receives a switching operation for switching the working application in the terminal device from the print application to the browser from the user. The OS determines whether the image data can be transmitted via the browser or not. The OS determines that the image data can be transmitted. The OS instructs the print application to suspend the process and notifies the print application that the remaining image data will be transmitted using the browser.

When the print application receives the suspend instruction, the print application moves from the active state to the background state and transmits the code to the MFP. The code includes a notification to suspend transmitting image data and a notification to transmit the remaining image data by the browser.

When the MFP receives the code, the MFP suspends receiving the image data, and notifies the information of the destination of the remaining image data (for example, URL or the like) to the print application. The destination is where the MFP stores the remaining image data. The destination is decided so that the browser is accessible to the destination.

When receiving the destination information from the MFP, the print application informs the OS of the destination information. When receiving the destination information from the print application, the OS quits the print application. The print application moves from the background state to the suspend state.

After quitting the print application, the OS starts up the browser. Herewith, the working application in the terminal device is switched from the print application to the browser. The browser becomes active. The OS sets the destination to the browser. By accessing the destination, the browser transmits the remaining image data to the destination.

After the MFP finishes receiving the image data, the MFP prints out the image data.

Figure 19:
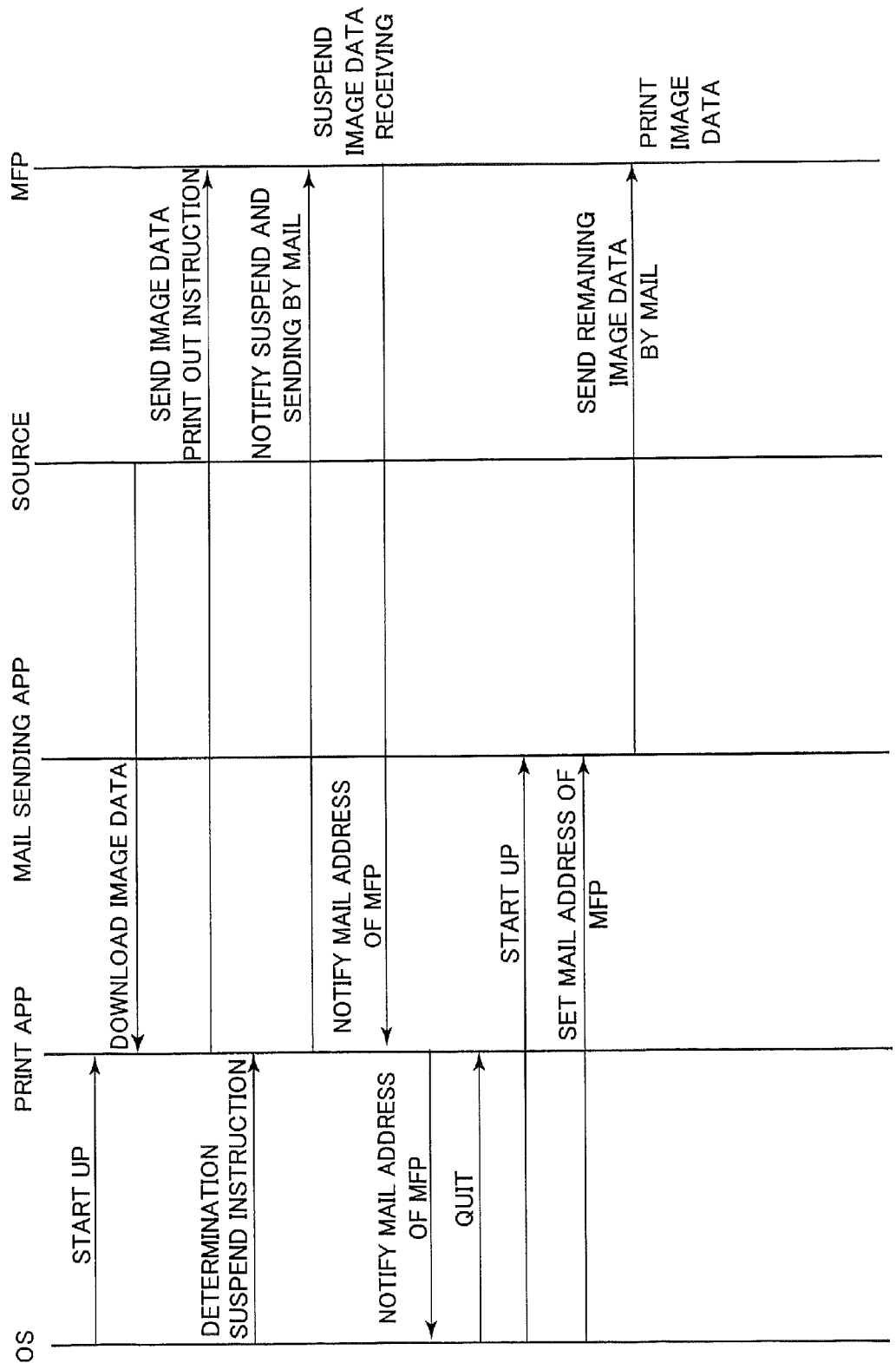
FIG. 19 shows a sequence diagram for explanation pertaining to the behavior of the image processing system, in case that the type of the another application after the switching is a mail receiving application, in the fifth situation.

(5-2) In Case that the Type of the Another Application after the Switching is a Mail Transmitting Application FIG. 19 shows a sequence diagram for explanation pertaining to the behavior of the image processing system, in case that the type of the another application after the switching is the mail transmitting application, in the fifth situation.

Referring to FIG. 19, in a manner similar to FIG. 18, the OS receives a switch operation for switching the working application in the terminal device from the print application to a mail transmitting application from a user, during the print application transmits the image data to the MFP. The OS determines whether the image data can be transmitted or not via the mail transmitting application. The OS determines that the image data can be transmitted. The OS instructs the print application to suspend processes, and notifies the print application that the remaining image data will be transmitted by using the mail transmitting application.

When the print application receives the suspend instruction, the print application moves from the active state to the background state, and transmits a code to the MFP. The code includes a notification for suspending transmission the image data and a notification for transmitting the remaining image data by e-mail.

After receiving the code, the MFP suspends receiving the image data, and notifies the print application of the mail address of the MFP.

After receiving the mail address of the MFP, the print application informs the OS of the mail address of the MFP. When receiving the mail address of the MFP from the print application, the OS quits the print application. The print application moves from the background state to the suspend state.

After quitting the print application, the OS starts up the mail transmitting application. Herewith, the working application in the terminal device is switched from the print application to the mail transmitting application. The mail transmitting application becomes active. The OS sets the mail address of the MFP in the mail transmitting application. The mail transmitting application transmits the remaining image data to the MFP by e-mail.

After the MFP finished receiving the image data, the MFP prints out the image data.

Figure 20:
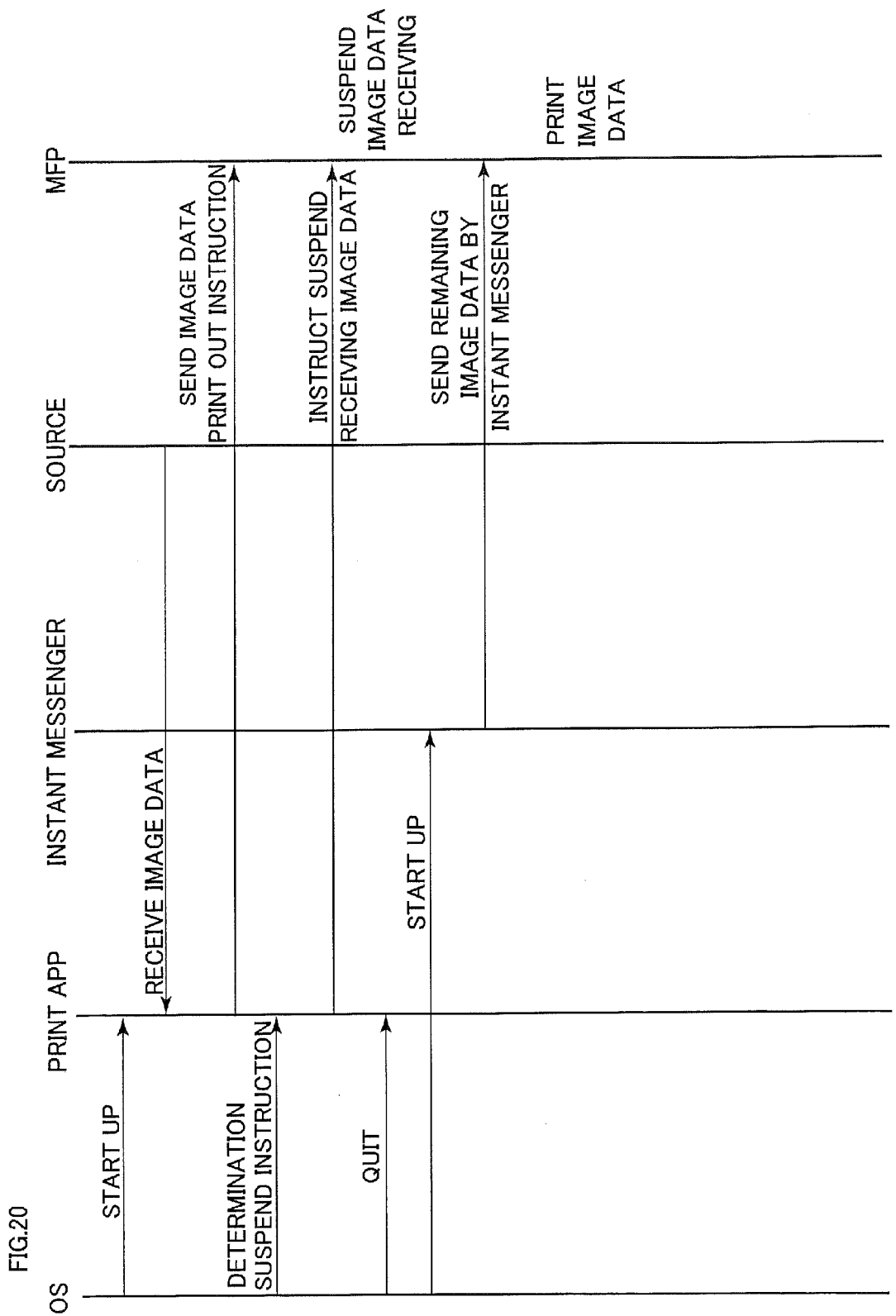
FIG. 20 shows a sequence diagram for explanation pertaining to the behavior of the image processing system, in case that the type of the another application after the switching is an instant messenger, in the fifth situation.

(5-3) In Case that the Type of the Another Application after the Switching is an Instant Messenger FIG. 20 shows a sequence diagram for explanation pertaining to the behavior of the image processing system, in case that the type of the another application after the switching is an instant messenger, in the fifth situation. In FIG. 20, it is supposed that the MFP is previously set as the destination of communication in the instant messenger.

Referring to FIG. 20, in a manner similar to FIG. 18, the OS receives a switch operation for switching the working application in the terminal device from the print application to the instant messenger from a user, during the print application transmits the image data to the MFP. The OS determines whether the image data can be transmitted or not via the instant messenger. The OS determines that the image data can be transmitted. The OS instructs the print application to suspend processes, and notifies the print application that the remaining image data will be transmitted by using the instant messenger.

When the scan application receives the suspend instruction, the scan application moves from the active state to the background state, and transmits a code to the MFP. The code includes a notification for suspending transmission the image data and a notification for transmitting the remaining image data by using the instant messenger.

After receiving the code, the MFP suspends receiving the image data.

After the print application transmitted the code, the OS quits the print application. The print application moves from the background state to the suspend state.

After quitting the print application, the OS starts up the instant messenger. Herewith, the working application in the terminal device is switched from the print application to the instant messenger. The instant messenger becomes active. The instant messenger transmits the remaining image data to the MFP.

After the MFP finished receiving the image data, the MFP prints out the image data.

(5-4) In Case that the Type of the Another Application after the Switching is the Application which Cannot Perform Communication In case that the type of the another application is the application which cannot perform communication, since the processes during the terminal device receives an instruction of performing a print job and the print application receives the suspend instruction are similar to the behavior of FIG. 18, the explanation is not repeated. After that, the OS configures the print application's settings of restarting the transmitting the untransmitted part when the print application starts up again, and quits the print application.

[The Notification for the Application]

The terminal device in the embodiment displays the received notification as the notification for the application on the display unit of the terminal device, when receiving the notification of the completion of storing the remaining image data, the notification of receiving the job ID, the notification of the completion of download, or the like.

Figure 21:
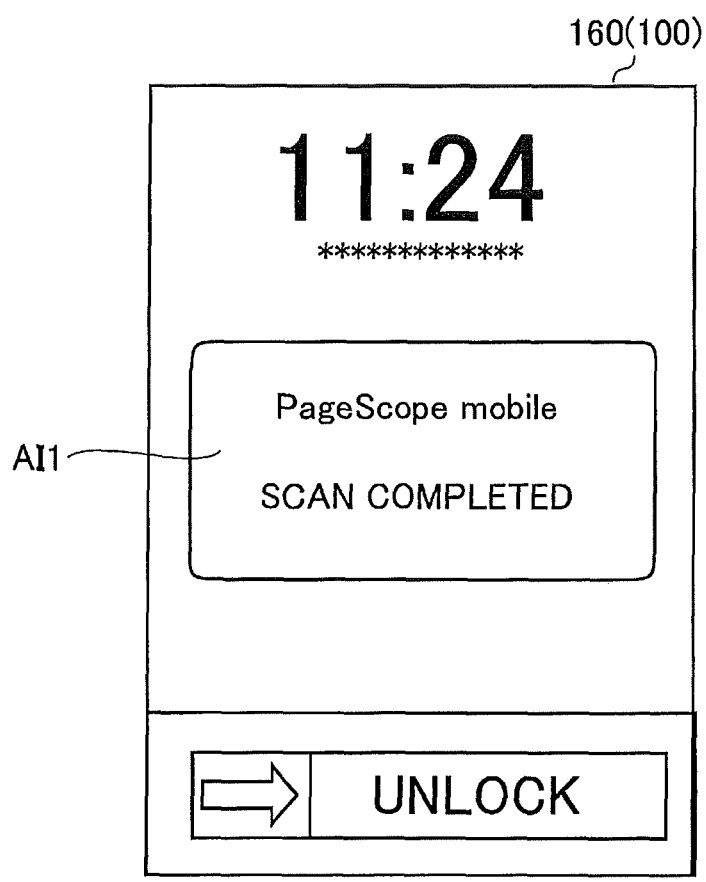
FIG. 21 shows the first example of the notification for the application displayed by the terminal device according to the embodiment of this invention.
Figure 22:
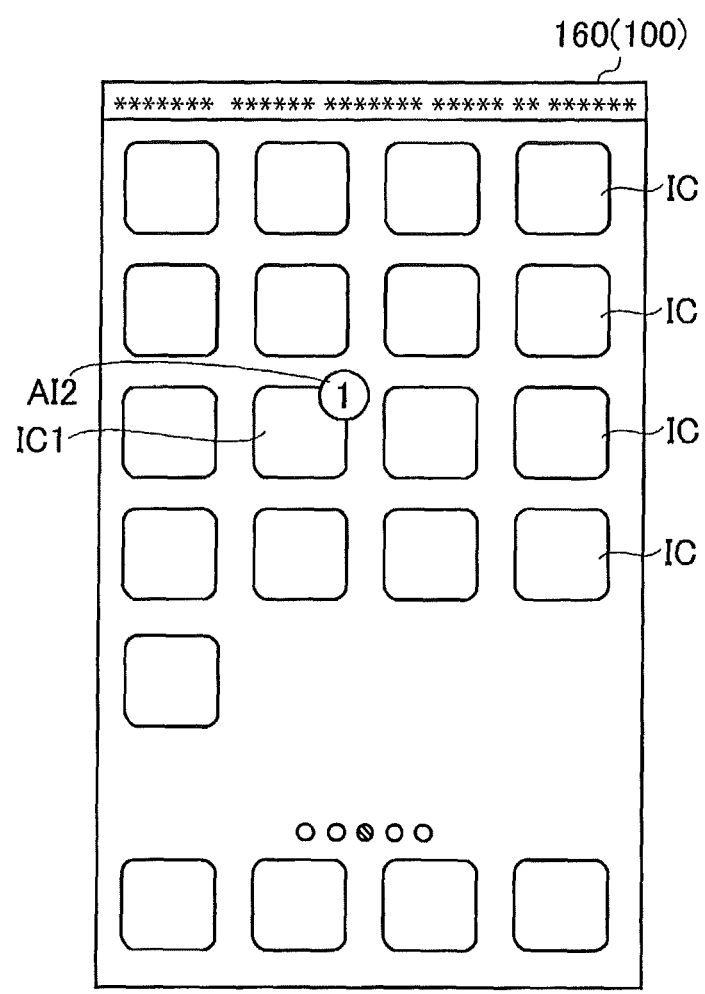
FIG. 22 shows the second example of the notification for the application displayed by the terminal device according to the embodiment of this invention.

FIGS. 21 and 22 show the examples of the notification for the application displayed by the terminal device according to the embodiment of this invention.

Referring to FIG. 21, terminal device 100 displays a standby screen on display unit 160. In the standby screen, date, clock time, and an operation guide for unlocking (the guide for the right direction flick) are displayed. Terminal device 100 displays pop up AI1 of the notification for the application on the standby screen, when receiving the notification of the completion of storing the remaining image data, the notification of receiving the job ID, the notification of the completion of download, or the like. The notification for the application AI1 includes the name of the application which received the notification ("PageScope mobile" in this Figure) and the contents of the notification (the completion of storing the remaining image data (the completion of the scan) in this Figure).

Referring to FIG. 22, when an unlock operation is received on the standby screen, terminal device 100 displays a basic screen on display unit 160. The basic screen includes a plurality of icons IC for applications installed in terminal device 100. Terminal device 100 displays the notification for the application AI2 of the numeral "1" at the upper right of the icon IC1 for the cooperation application program, when receiving the notification of the completion of storing the remaining image data, the notification of receiving the job ID, the notification of the completion of download, or the like, for example. The numeral in the notification for the application AI2 shows the number of notifications for the cooperation application program, which the user of terminal device 100 has not confirmed. During the notification for the application AI2 is displayed, when the user of terminal device 100 taps icon IC1, terminal device 100 starts up the cooperation application program and displays the contents of the notification on display unit 160.

[The Advantages of the Embodiment]

According to the embodiment, when the terminal device is executing the transmitting and receiving process to transmit or receive the image data with the image processing device, and the working application in the terminal device is switched to another application which is different from the cooperation application program, the terminal device executes the transmitting and receiving process for the remaining image data via the another application. Herewith, the user of the terminal device does not have to perform the operation for the transmitting and receiving process again to complete the transmitting and receiving process. In consequence, the convenience can be improved.

The terminal device determines whether the image data can be received from the image processing device or not via the another application, when the working application in the terminal device is switched to the another application during the terminal device receives the image data. In case that the terminal device can receive the image data via the another application, the terminal device receives the remaining image data via the another application. Herewith, the remaining image data can be properly received.

When the terminal device cannot receive the image data via the another application, the terminal device requests the image processing device to store the remaining image data temporarily. The terminal device receives the notification of the completion of storing the remaining image data from the image processing device. Herewith, the terminal device starts up the cooperation application program again and properly receives the remaining image data.

The terminal device transmits the remaining image data via the another application, when switching the working application in the terminal device to the another application during the terminal device transmits the image data. Herewith, the terminal device can properly transmit the remaining image data.

[Others]

According to the embodiment, the terminal device, the control method of the terminal device, and the control program of the terminal device which improve convenience can be provided.

When the transmitting and receiving process for the image data with an image processing device is interrupted, the terminal device may perform transmitting and receiving process for the remaining image data via the second application without determination, at all times.

The processes described in the above embodiments can be executed by software or a hardware circuit. A computer program which executes the processes in the above embodiments can be provided. The program may be provided recorded in recording media of CD-ROMs, flexible disks, hard disks, ROMs, RAM, memory cards, or the like to users. The program is executed by a computer of a CPU or the like. The program may be downloaded to a device via communication lines like the internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A terminal device comprising a processor which performs communication with an image processing device, the processor is configured to:
   execute a first communication process for image data with the image processing device via a first application;
   switch a working application in the terminal device to a second application which is different from the first application, during the first communication process;
   suspend the first communication process when the working application in the terminal device is switched; and
   execute a second communication process for a part of the image data for which the first communication process is not performed, via the second application, when the first communication process was suspended,
   wherein the first and second applications are not active simultaneously.

2. The terminal device according to claim 1, wherein the first and the second communication processes are receiving the image data from the image processing device.

3. The terminal device according to claim 2, wherein the processor is configured to:

determine whether the image data can be received from the image processing device via the second application, when the working application in the terminal device is switched; and receive an unreceived part of the image data, in case that the image data can be received from the image processing device via the second application.

4. The terminal device according to claim 3, wherein the processor is configured to:

notify a type of the second application which is used for receiving the unreceived part to the image processing device, before receiving the unreceived part, in case that the image data can be received from the image processing device via the second application.

5. The terminal device according to claim 3, wherein the processor is configured to:

receive information about a first storing destination in which the image processing device stores the unreceived part of the image data from the image processing device, in case that the image data can be received from the image processing device via the second application and a type of the second application is a browser; and execute the second communication process in which the unreceived part of the image data is received from the first storing destination via the second application.

6. The terminal device according to claim 3, wherein the processor is configured to:

transmit a mail address of the terminal device to the image processing device, in case that the image data can be received from the image processing device via the second application and a type of the second application is a mail receiving application; and execute the second communication process in which the unreceived part of the image data is received by e-mail.

7. The terminal device according to claim 3, wherein the processor is configured to:

receive the unreceived part of the image data from a source preset in the second application, in case that the image data can be received from the image processing device via the second application and a type of the second application is an instant messenger.

8. The terminal device according to claim 3, wherein the processor is configured to:

request the image processing device to store the unreceived part of the image data in a second storing destination other than the terminal device, in case that the image data cannot be received from the image processing device via the second application.

9. The terminal device according to claim 8, wherein the processor is configured to:

receive a notification of completion of storing the unreceived part of the image data from the image processing device after the request.

10. The terminal device according to claim 3, wherein the processor is configured to:

store the image data in a final storing destination of a server via the first or the second application after receiving the unreceived part.

11. The terminal device according to claim 10, wherein the processor is configured to:

notify the second application of information about the final storing destination, in case that the image data can be received from the image processing device via the second application and a type of the second application is a browser; and store the image data in the final storing destination via the second application, based on the notified information.

12. The terminal device according to claim 10, wherein the processor is configured to:

transmit information for identifying the terminal device and for identifying a job in which the image data is stored in the final storing destination to the image processing device, in case that the image data can be received from the image processing device via the second application and a type of the second application is a mail receiving application or an instant messenger;

notify the first application of the information for identifying the job, after the information was transmitted to the image processing device;

switch the working application in the terminal device to the first application again, after receiving the unreceived part; and store the image data in the final storing destination via the first application based on the notified information for identifying the job, after the switching the working application in the terminal device.

13. The terminal device according to claim 3, wherein the processor is configured to:

transmit a setting for receiving the unreceived part of the image data, from the first application to the second application, when switching the working application in the terminal device and a type of the second application is a browser;

receive the unreceived part via the second application based on the transmitted setting;

switch the working application in the terminal device to the first application again, after the unreceived part was received; and transmit the image data and an execution instruction of a print job to the image processing device via the first application, when the working application in the terminal device was switched.

14. The terminal device according to claim 1, wherein the first and the second communication processes are transmitting the image data to the image processing device.

15. The terminal device according to claim 14, wherein the processor is configured to:

transmit a setting for transmitting an untransmitted part of the image data, from the first application to the second application, when switching the working application in the terminal device and a type of the second application is a browser; and transmit the untransmitted part via the second application based on the transmitted setting.

16. The terminal device according to claim 14, wherein the processor is configured to:

determine whether the image data can be transmitted to the image processing device via the second application, when the working application in the terminal device is switched; and transmit an untransmitted part of the image data, in case that the image data can be transmitted to the image processing device via the second application.

17. The terminal device according to claim 16, wherein the processor is configured to:

receive information about a third storing destination in which the image processing device stores the untransmitted part of the image data from the image processing device, in case that the image data can be transmitted to the image processing device via the second application and a type of the second application is a browser; and execute the second communication process in which the untransmitted part of the image data is transmitted to the third storing destination via the second application.

18. The terminal device according to claim 16, wherein the processor is configured to:

receive a mail address of the image processing device, in case that the image data can be transmitted to the image processing device via the second application and a type of the second application is a mail transmitting application; and execute the second communication process in which the untransmitted part of the image data is transmitted to the image processing device by e-mail.

19. The terminal device according to claim 16, wherein the processor is configured to:

transmit the untransmitted part of the image data to a destination preset in the second application, in case that the image data can be transmitted to the image processing device via the second application and a type of the second application is an instant messenger.

20. The terminal device according to claim 1, wherein the switching of the working application in the terminal device to the second application, during the first communication process, causes the first application to change to a background state during which the first application is subsequently changed to a suspend state to suspend the first communication process when the working application in the terminal device is switched.

21. The terminal device according to claim 1, wherein:

an operating system which controls behavior of the first and second applications is installed in the terminal device; and the operating system cannot make the first and second applications active simultaneously.

22. A method of controlling a terminal device which performs communication with an image processing device, the method comprising the steps of:

executing a first communication process for image data with the image processing device via a first application;

switching a working application in the terminal device to a second application which is different from the first application, during the first communication process;

suspending the first communication process when the working application in the terminal device is switched; and executing a second communication process for a part of the image data for which the first communication process is not performed, via the second application, when the first communication process was suspended, wherein the first and second applications are not active simultaneously.

23. The method according to claim 22, wherein the switching of the working application in the terminal device to the second application, during the first communication process, causes the first application to change to a background state during which the first application is subsequently changed to a suspend state to suspend the first communication process when the working application in the terminal device is switched.

24. A non-transitory computer-readable recording medium storing a controlling program for a terminal device which performs communication with an image processing device, the program causing a computer to execute the steps of:

executing a first communication process for image data with the image processing device via a first application;

switching a working application in the terminal device to a second application which is different from the first application, during the first communication process;

suspending the first communication process when the working application in the terminal device is switched; and executing a second communication process for a part of the image data for which the first communication process is not performed, via the second application, when the first communication process was suspended, wherein the first and second applications are not active simultaneously.

25. The non-transitory computer-readable recording medium according to claim 24, wherein the switching of the working application in the terminal device to the second application, during the first communication process, causes the first application to change to a background state during which the first application is subsequently changed to a suspend state to suspend the first communication process when the working application in the terminal device is switched.

* * * * *